(12) United States Patent
Sugaya et al.

(10) Patent No.: US 7,821,908 B2
(45) Date of Patent: Oct. 26, 2010

(54) OPTICAL DISC, OPTICAL DISC APPARATUS, AND OPTICAL DISC REPRODUCING METHOD

(75) Inventors: Toshihiro Sugaya, Moriya (JP); Hisashi Yamada, Yokohama (JP); Masato Otsuka, Tokyo (JP)

(73) Assignees: Kabushiki Kaisha Toshiba, Tokyo (JP); Memory-Tech Corporation, Ibaraki (JP)

( * ) Notice: Subject to any disclaimer, the term of this patent is extended or adjusted under 35 U.S.C. 154(b) by 1011 days.

(21) Appl. No.: 11/289,303

(22) Filed: Nov. 30, 2005

(65) Prior Publication Data

US 2006/0114808 A1 Jun. 1, 2006

(30) Foreign Application Priority Data

Nov. 30, 2004 (JP) ............................. 2004-347760

(51) Int. Cl.
*G11B 7/24* (2006.01)
*G11B 7/20* (2006.01)
*G11B 11/00* (2006.01)

(52) U.S. Cl. .................. 369/275.3; 369/94; 369/13.38; 369/13.39

(58) Field of Classification Search .................. None
See application file for complete search history.

(56) References Cited

U.S. PATENT DOCUMENTS

| 5,608,715 | A | * | 3/1997 | Yokogawa et al. ....... 369/275.1 |
| 5,732,065 | A | | 3/1998 | Braat et al. |
| 5,764,621 | A | | 6/1998 | Choi |
| 5,841,861 | A | * | 11/1998 | Kondo et al. .................. 705/57 |
| 6,137,766 | A | * | 10/2000 | Utsumi ..................... 369/275.1 |
| 2002/0051417 | A1 | * | 5/2002 | Muramatsu et al. ...... 369/59.25 |
| 2004/0062530 | A1 | * | 4/2004 | Tsumagari et al. .......... 386/125 |

(Continued)

FOREIGN PATENT DOCUMENTS

| JP | 08-339574 | 12/1996 |
| JP | 09-161387 | 6/1997 |

(Continued)

OTHER PUBLICATIONS

ECMA Standardizing Information and Communication Systems, Standard ECMA-267 3$^{rd}$ Edition, Apr. 2001, pp. 1-83.

(Continued)

*Primary Examiner*—Wayne R Young
*Assistant Examiner*—Carl Adams
(74) *Attorney, Agent, or Firm*—Pillsbury Winthrop Shaw Pittman, LLP

(57) ABSTRACT

A single disc is configured to deal with both HD DVD information and DVD information. This invention has the following basic elements (1) a single-sided dual layer optical disc where a light transmission layer, a first recording layer accessed with a first laser beam, an space layer, and a second recording layer accessed with a second laser beam are arranged in that order in the direction in which a laser beam enters, (2) the areal recoding density of the second recording layer is three times or more that of the first recording layer, (3) information indicating that the second recording layer has been formed is formed in the first recording layer, and (4) information indicating that the first recording layer has been formed is formed in the second recording layer.

6 Claims, 18 Drawing Sheets

U.S. PATENT DOCUMENTS

| | | | |
|---|---|---|---|
| 2004/0246869 A1* | 12/2004 | Dierks | 369/94 |
| 2005/0068876 A1* | 3/2005 | Tanaka et al. | 369/59.25 |
| 2006/0104172 A1* | 5/2006 | Grampel et al. | 369/44.37 |

FOREIGN PATENT DOCUMENTS

| | | |
|---|---|---|
| JP | 10-021673 | 1/1998 |
| JP | 10-199031 | 7/1998 |
| JP | 11-025517 | 1/1999 |
| JP | 11-110806 | 4/1999 |
| JP | 11-296861 | 10/1999 |
| JP | 2000-021082 | 1/2000 |
| JP | 2001-176129 | 6/2001 |
| JP | 2001-338459 | 12/2001 |
| JP | 3248415 B2 | 1/2002 |
| JP | 2003-219326 | 7/2003 |
| JP | 2004-095098 | 3/2004 |

OTHER PUBLICATIONS

Japanese Office Action dated Jan. 6, 2009 for Appln. No. 2004-347760.

* cited by examiner

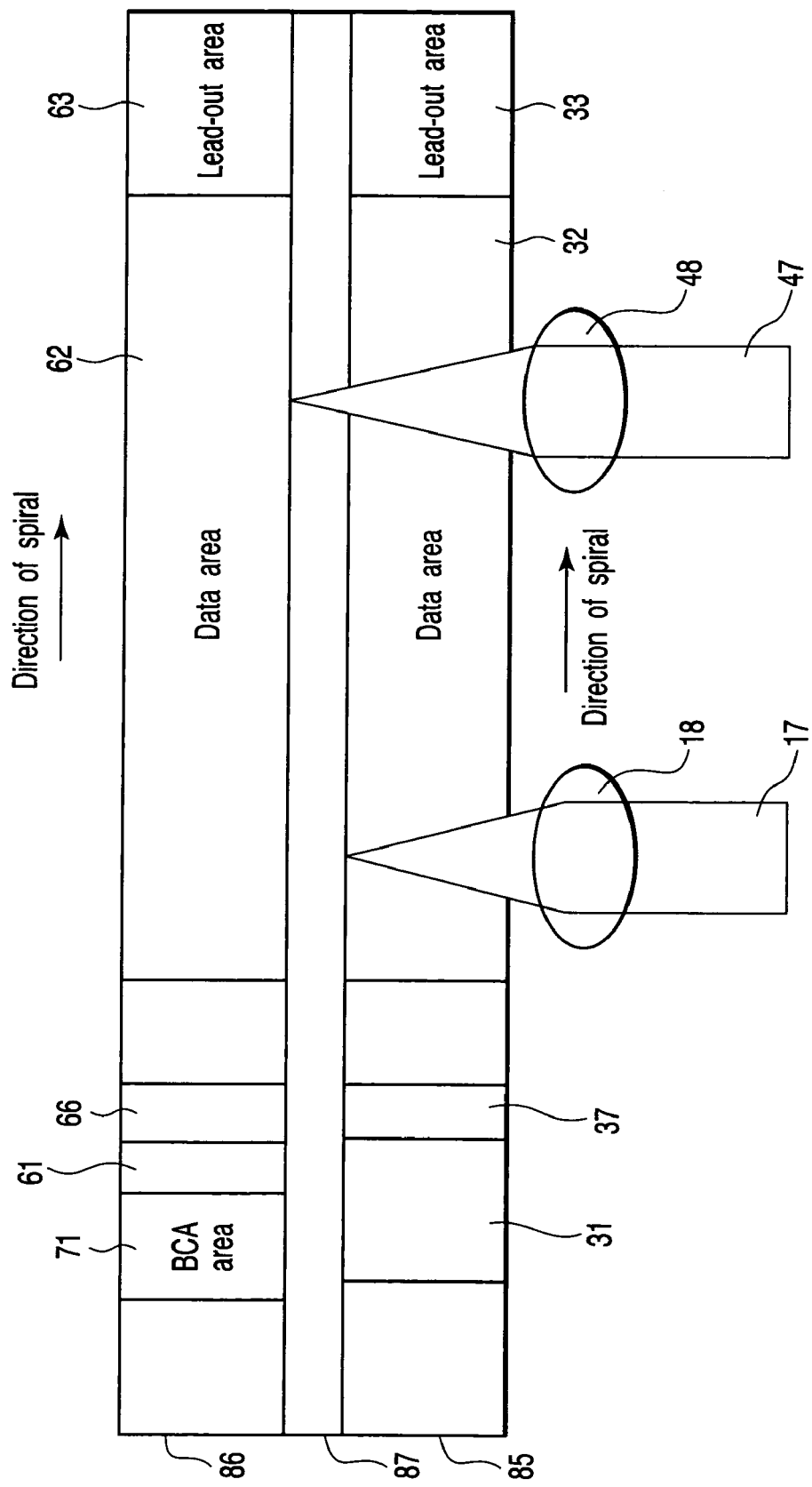
F I G. 8

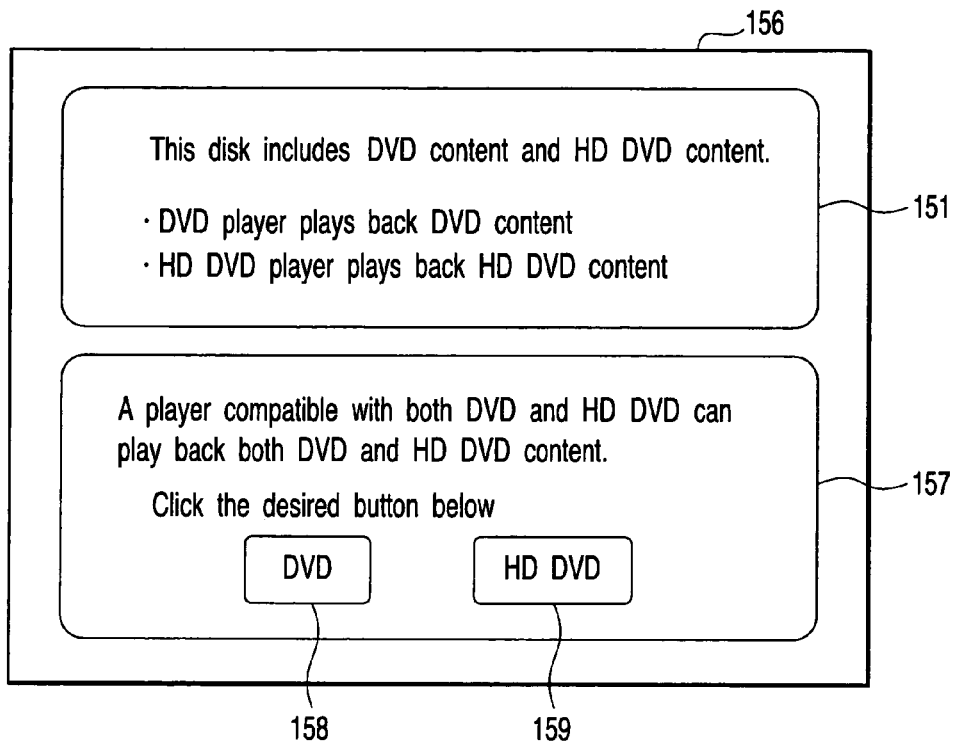
FIG. 11
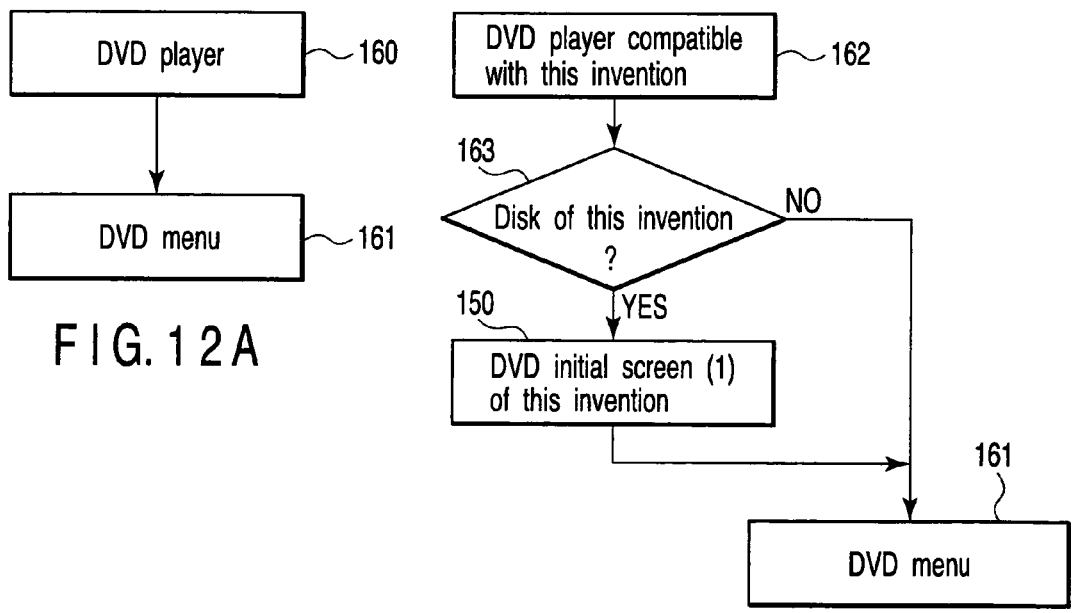
FIG. 12A
FIG. 12B

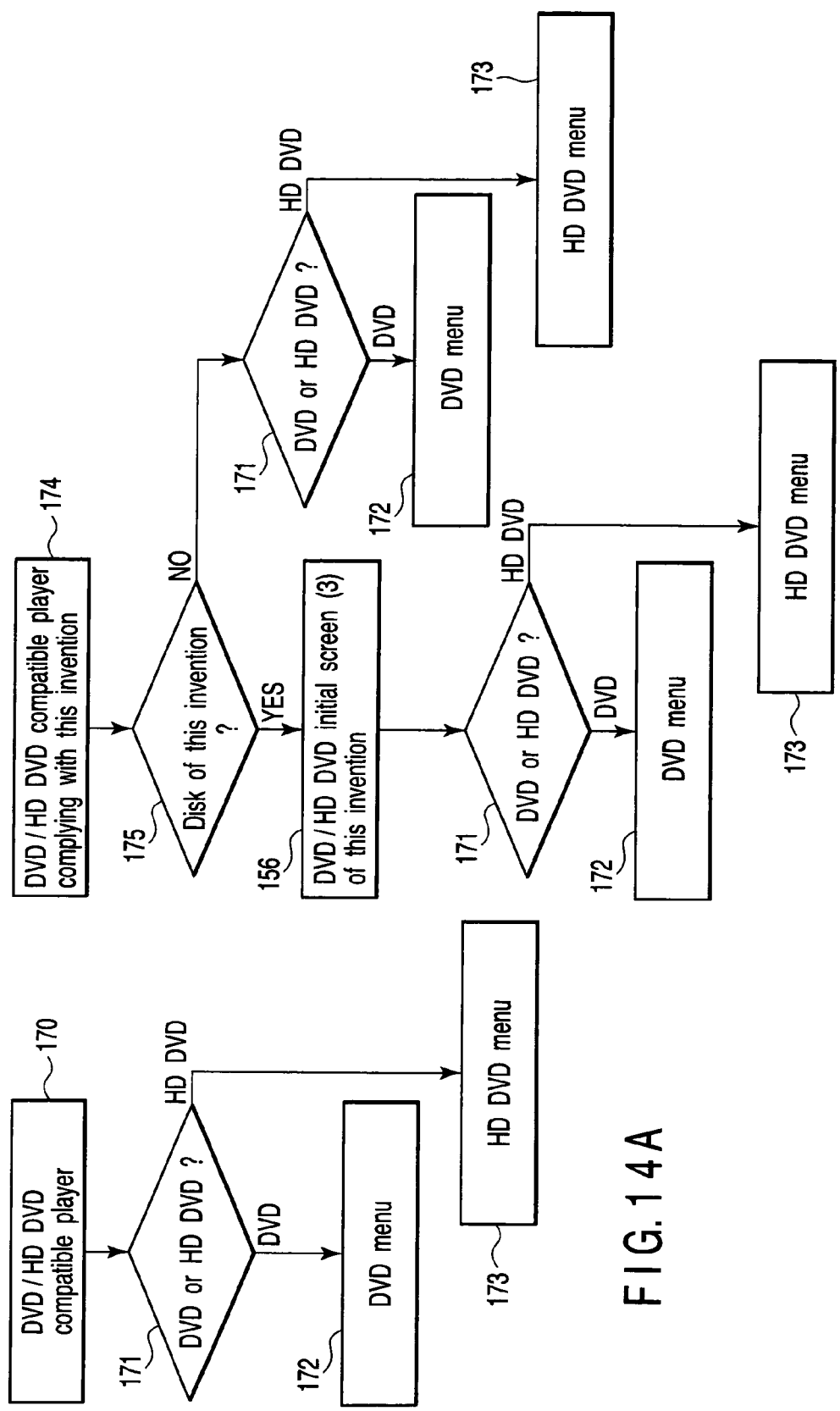

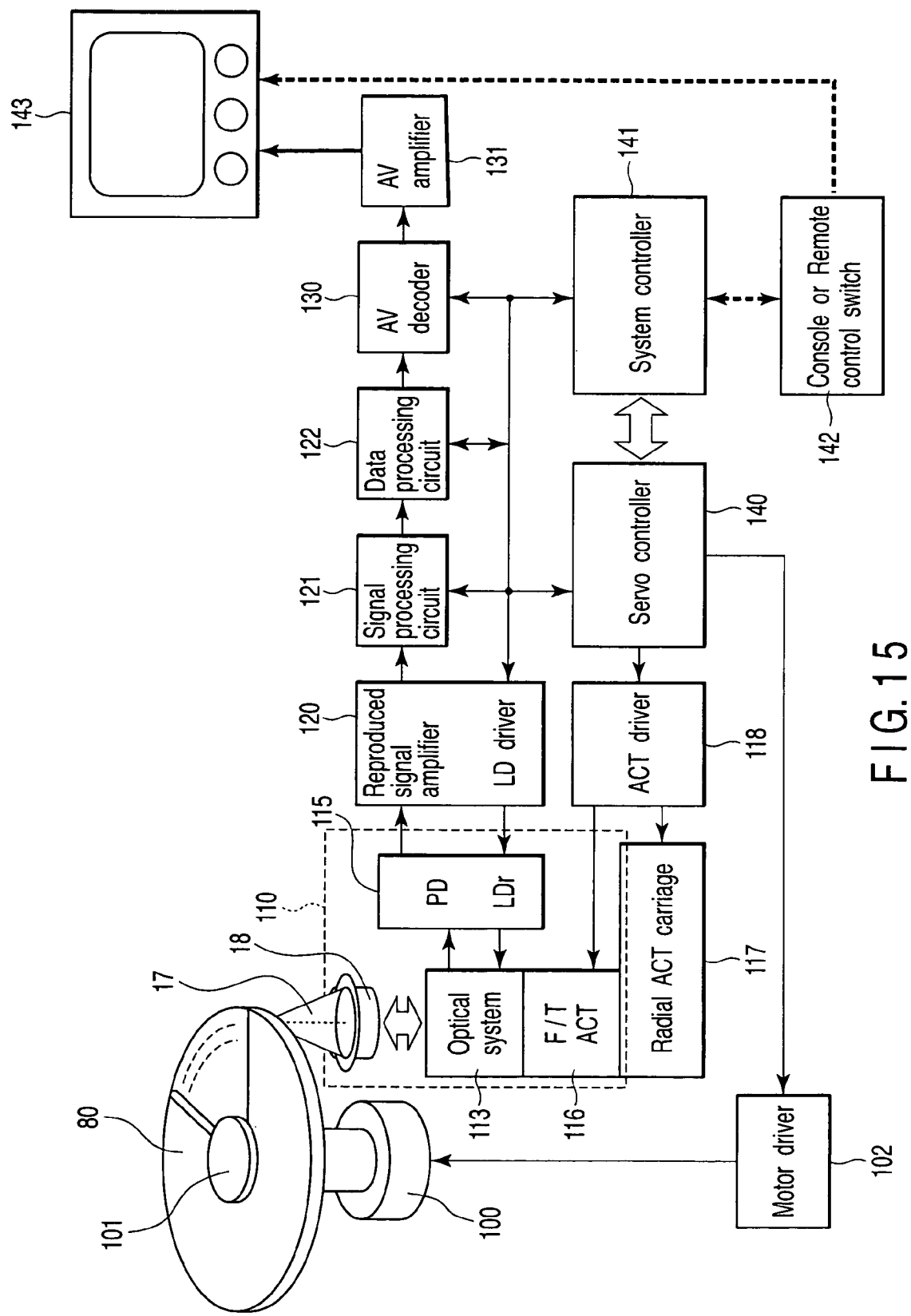
F I G. 15

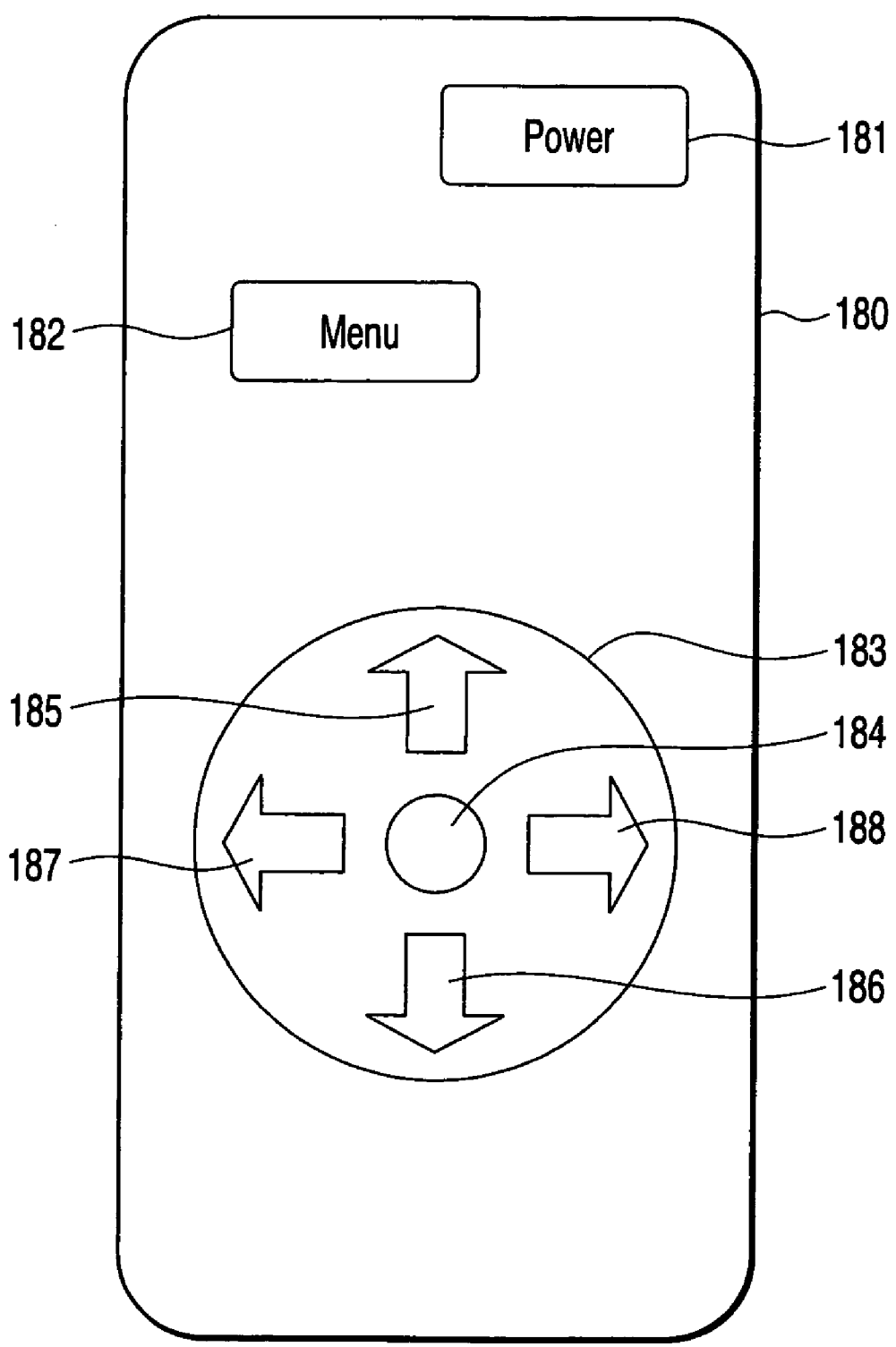
F I G. 16

OPTICAL DISC, OPTICAL DISC APPARATUS, AND OPTICAL DISC REPRODUCING METHOD

CROSS-REFERENCE TO RELATED APPLICATIONS

This application is based upon and claims the benefit of priority from prior Japanese Patent Application No. 2004-347760, filed Nov. 30, 2004, the entire contents of which are incorporated herein by reference.

BACKGROUND OF THE INVENTION

1. Field of the Invention

This invention relates to an optical disc, such as a DVD, which stores digitized audio and visual content, such as movies and music, and an optical disc which reads the recorded information on the optical disc.

2. Description of the Related Art

Outline of DVD Standard

One known type of optical disc for storing digital images is Digital Versatile Disc (DVD), which has been widely used mainly in storing and delivering of movie content all over the world. DVD is the standard determined by the DVD forum, which is open to the public as the DVD standard (DVD Book) (refer to www.dvdforum.org). The DVD standard has also been determined in International standards and JIS. Here, ECMA-267 is a document related to the International standard on 120 mm DVD-ROM, one of the DVD physical standards. Hereinafter, a brief explanation will be given referring to ECMA-267.

There are four types of 120 mm DVD-ROM: single-sided single layer, single-sided dual layer, double-sided single layer, and double-sided dual layer. In delivery of an accumulation of content, such as movies, there are two types of single-sided discs: one is a single-sided single layer disc with a capacity of 4.7 GB and the other is a single-sided dual layer disc with a capacity of 4.27 GB per layer (a total capacity of 8.54 GB per disc).

The development of a disc whose capacity is larger than that of the aforementioned DVD (referred to as the existing DVD) has been desired. This comes from a desire to store high-definition (HD) images into a single disc (temporarily referred to as the next-generation DVD).

[Non-Patent Document] ECMA-267

With the development of the next generation DVD, it will be possible to design a next-generation DVD device (drive or player) for the next-generation DVD so as to read not only the next-generation DVD but also the existing DVD. Since the next-generation DVD differs from the existing DVD in recording density, modulation system, signal processing, track format, and the like, a conventional DVD device (drive or player) cannot read the data from the next-generation DVD. That is, the conventional DVD device has the disadvantage of being unable to read not only HD movie content recorded on the next-generation DVD disc but also conventional DVD movie content recorded on the next-generation DVD, which may lead to a factor that hinders the spread of the next-generation DVD.

BRIEF SUMMARY OF THE INVENTION

It is, accordingly, an object of the present invention to provide an optical disc, an optical disc apparatus, and an optical disc reproducing method which enable a single disc to carry not only the information recorded in the next-generation DVD format but also the information recorded in the existing DVD format and make it easier for a reproducing apparatus and the user to recognize the configuration of the disc.

According to an aspect of the present invention, there is provided an optical disc of a single-sided dual layer where a light transmission layer, a first recording layer accessed with a first laser beam, a space layer, and a second recording layer accessed with a second laser beam are arranged in that order in the direction in which a laser beam enters, the optical disc characterized in that: the areal recoding density of the second recording layer is three times or more that of the first recording layer; information indicating that the second recording layer has been formed is formed in the first recording layer; and information indicating that the first recording layer has been formed is formed in the second recording layer.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 8 shows an example of the configuration of a recording area of an optical disc according to the present invention;

FIG. 11 shows a DVD/HD DVD initial screen (3) compatible with the present invention;

FIGS. 12A and 12B are flowcharts to help explain the relationship between the DVD player and the initial screen outputting process;

FIGS. 14A and 14B are flowcharts to help explain the relationship between the DVD/HD DVD compatible player and the initial screen outputting process;

FIG. 15 shows an example of the configuration of a DVD player compatible with the present invention;

FIG. 16 shows a remote control switch unit of the DVD player or HD DVD player;

DETAILED DESCRIPTION OF THE INVENTION

Hereinafter, referring to the accompanying drawings, embodiments of the present invention will be explained. To make it easier to understand the present invention, the technologies of the existing DVD and the next-generation DVD will be explained. Then, the basic configuration of the next-generation DVD according to the present invention will be explained using FIG. 8.

<Single-Sided Single Layer DVD>

Figure 1:
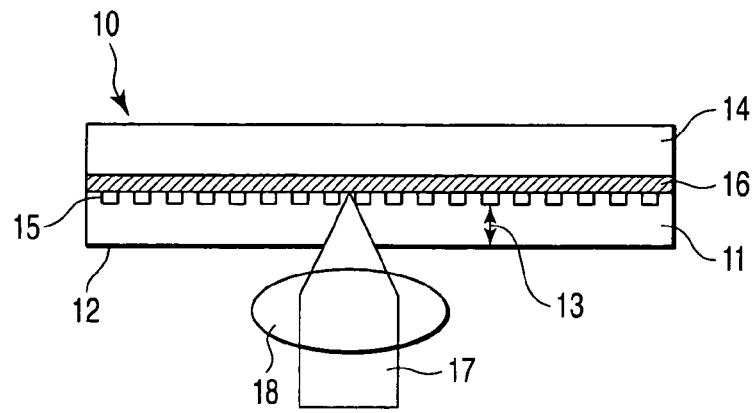
FIG. 1 shows the relationship between the basic structure of a single-sided single layer DVD disc and an optical head.

FIG. 1 shows the relationship between the basic structure of a single-sided single layer DVD disc 10 and an optical head. As is well known, the DVD disc 10 has such a structure as bonded two 0.6 mm thickness disc substrates together. One of the substrates is a signal substrate 11 and the other is a dummy substrate 14. The signal substrate and the dummy substrate are bonded together with an adhesive layer 16 in such a manner that a recording layer 15 lies between the two substrates. Generally, these substrates are made of such plastic material as polycarbonate with an injection molding machine.

In the signal substrate 11, video information, data information, and the like are recorded in a spiral track in the form of embossed pits. Red laser 17 (with a wavelength of 650 nm) for reading the information in the recording layer is converged by an objective lens 18 (with NA of 0.6), passes through a light transmission layer 13 of the signal substrate 11, and is focused on the recording layer 15.

In the case of a Normal single layer, the center value of the thickness of the light transmission layer 13 is 600 µm and lies in a position a minimum distance of 570 µm and a maximum distance of 630 µm away from the incidence plane. The value is determined, taking the spherical aberration of the objective lens 18 into account. Recently, a Thin single layer where the center value of the recording is 565 µm and lies in a position a minimum distance of 550 µm and a maximum distance of 580 µm away from the incidence plane even in a single-sided single layer disc has been added to the DVD standard (refer to www.dvdforum.org or the DVD-Book).

Figure 2:
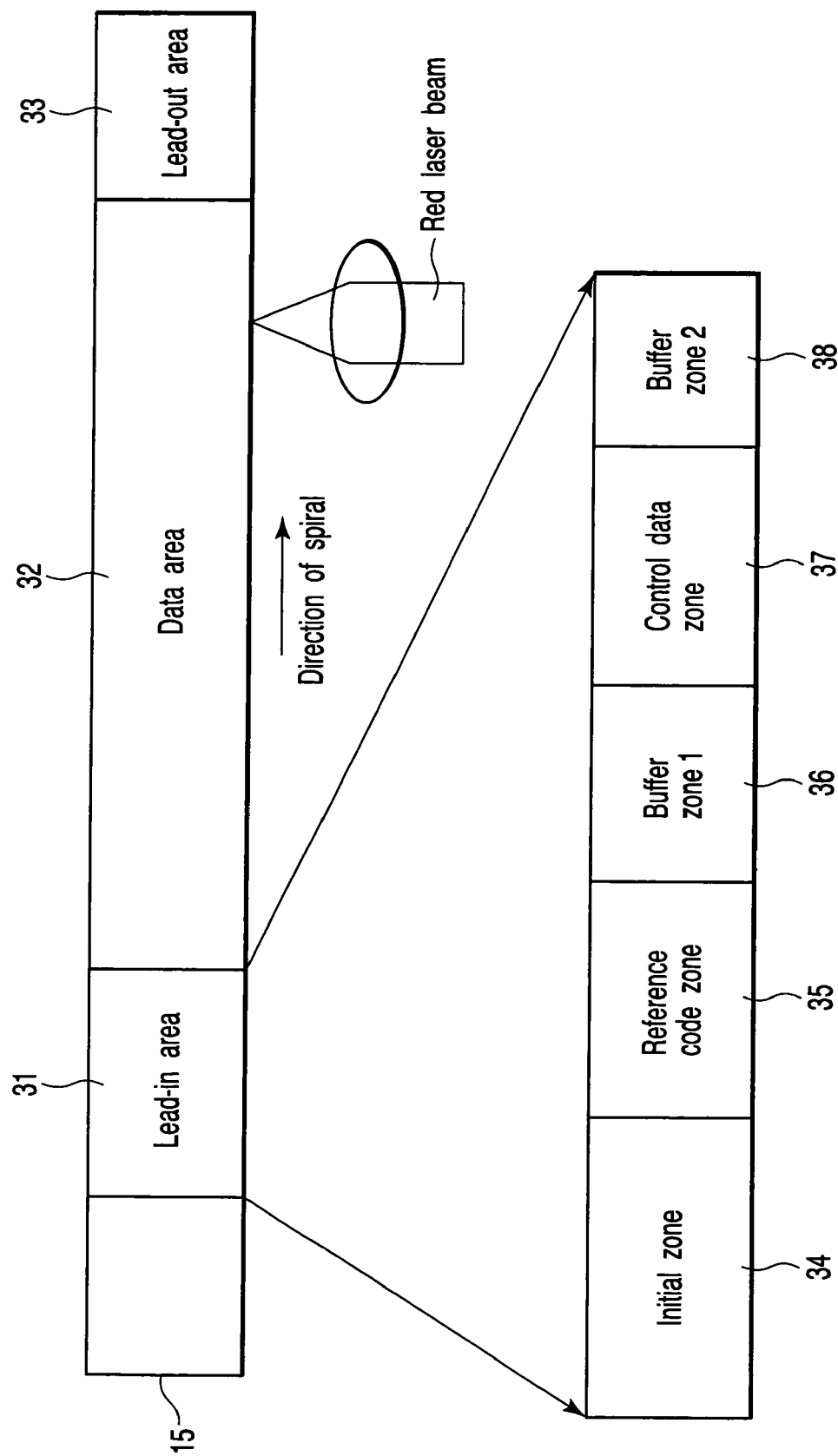
FIG. 2 shows the configuration of a recording area of a single-sided single layer DVD disc.

FIG. 2 shows the configuration of a recording area of a single-sided single layer DVD disc. A DVD recording layer 15 is composed of a Lead-in area 31, a Data area 32, and a Lead-out area 33 arranged in that order from the inner edge toward the outer edge. In the Lead-in area 31, a Control data zone 37 is formed. The Lead-in area 31 further includes an Initial zone 34, a Reference code zone 35, a Buffer zone 1 36, and a Buffer zone 2 38.

<Single-Sided Dual Layer DVD>

Figure 3:
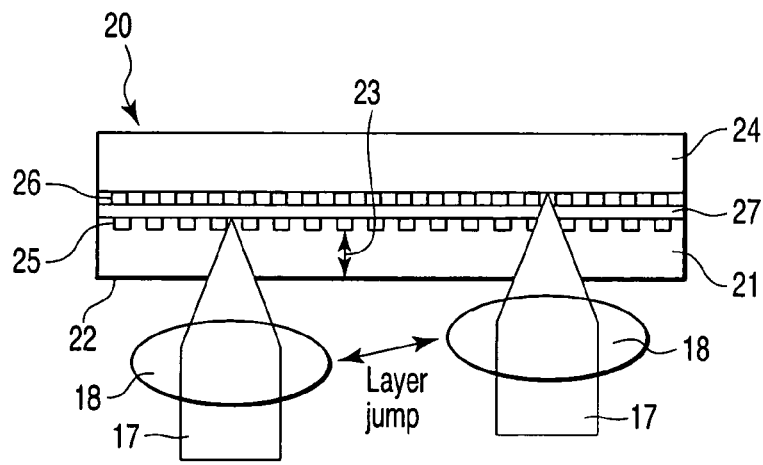
FIG. 3 shows the relationship between the basic structure of a single-sided dual layer DVD disc and an optical head.

FIG. 3 shows the relationship between the basic structure of a single-sided dual layer disc 20 and an optical head. As is well known, this disc has a first recording layer (L0 layer) 25 and a second recording layer (L1 layer) 26. The two recording layers can be accessed from one side of the disc, thereby reproducing the signal. In FIG. 3, when viewed from the incidence plane 22, there are a light transmission layer 23, the first recording layer 25, and the second recording layer 26 in that order. The individual recording layers are accessed by moving the objective lens 18 with a lens actuator and causing the red leaser 17 to make a layer jump.

The dual layer disc is characterized in that it can be produced almost in the same manner as a single-sided single layer disc. A signal substrate 21 where the first recording layer 25 is to be formed and a signal substrate 24 where the second recording layer 26 is to be formed are produced separately with two injection molding machines. Next, a translucent film is provided on the first recording layer 25 and a high-reflectivity film is provided on the second recording film 26. Then, the two substrates are bonded with a space layer 27 in such a manner that the recording layers lie between the two substrates, which completes the disc.

The first recording layer 25 is limited to a position a minimum distance of 550 µm away from the incidence plane 22 and the second recording layer is limited to a position a maximum distance of 640 µm away from the incidence plane 22 and the distance between the two layers (or space layer 27) is set as 55±15 µm (40 to 70 µm), taking into account the spherical aberration of the objective lens and crosstalk between recording layers. The thickness of the space layer 27 is generally equal to the thickness of the adhesive layer with which the two substrates are bonded. In an actual manufacture, the distance is determined, taking into account the bonding accuracy and the formation accuracy of the signal substrate 21.

<Reflectivity and Others of the Recording Layers>

The reflectivity of the recording layer is determined as follows:

Single layer disc: 45% to 85% (with PBS), 60% to 80% (without PBS: circular polarized light)

Dual layer disc: 18% to 30% (with PBS), 18% to 30% (without PBS: circular polarized light)

Information indicating the Reflectivity of the disc is b29 (a 29th bit) in a 4-byte ID (Identification Data) in a Data frame:

0b: when the Reflectivity is larger than 40% (with PBS)

1b: when the Reflectivity is smaller than 40% (with PBS)

Moreover, in the ID, the following have been written:

| Area type | b27 to b26 | |
|---|---|---|
| | 00b | In the Data area |
| | 01b | In the Lead-in area |
| | 10b | In the Lead-out area |
| | 11b | In the Middle area |
| Data type | b25 | |
| | 0b | Read-only data |
| | 1b | Other than Read-only data |
| Layer number | b24 | |
| | 0b | Layer0 of DL discs or on SL discs |
| | 1b | Layer 1 of DL discs | where the bit description and its contents are paired with one another.

Information as to whether the disc has a single layer or a dual layer, or on the disc structure, is defined in Byte Position (BP2) in Physical format information in Control data zone 37 formed in the Lead-in area of FIG. 2. In the information, the sixth and fifth bits (b6 and b5) represent the Number of recording layers:

|       |          |
|-------|----------|
| 00b   | Single   |
| 01b   | Dual     |
| Others: | reserved |

Furthermore, the capacity per layer in a single layer disc differs from that in a dual layer disc, since the single layer disc differs from the dual layer disc in linear recording density. Linear recording density is defined in Physical format information (BP3) in the Control data zone 37 in such a manner that b7 to b4 represent a Linear recording density as follows:

0000b: 0.267 µm (the Linear recording density for a single layer)

0001b: 0.293 µm (the Linear recording density for a dual layer)

<Next-Generation DVD>

As frequently reported in recent years, a blue-violet semiconductor laser (hereinafter, referred to as blue-violet laser) HD DVD whose recording density is three times or more that of DVD has been proposed to satisfy the desire to store high definition (HD) images into a single disc. The blue-violet laser HD DVD has been standardized in the DVD Forum (refer to www.dvdforum.org. It has not been produced yet on a commercial basis). HD DVD has the same disc structure as that of a conventional DVD. A single-sided single layer HD DVD has a capacity of 15 GB and a double-sided dual layer HD DVD has a capacity of 30 GB. These large capacities have been realized by new techniques, including a shorter wavelength of laser light, a larger NA, a modulation system, and new signal processing (Partial Response and Maximum Likelihood [PRML]).

Figure 4:
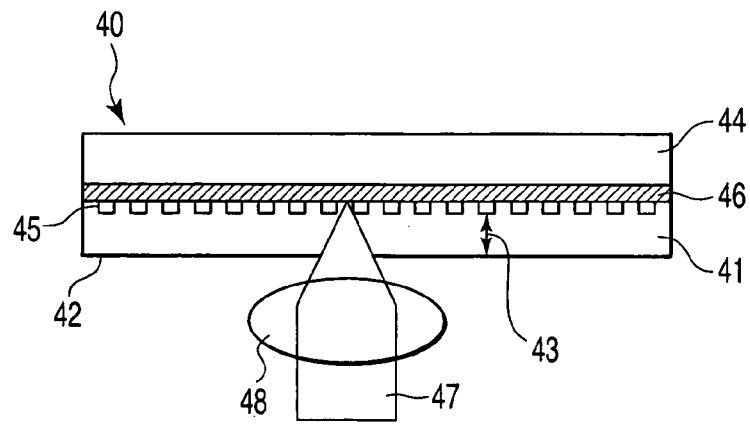
FIG. 4 shows the relationship between the basic structure of a single-sided single layer DVD disc and an optical head.

FIG. 4 shows the relationship between the basic structure of a single-sided single layer DVD disc 40 and an optical head. This is basically the same as DVD, except that a blue-violet laser beam 47 (with a wavelength of 405 nm) and an objective 48 with an NA of 0.65 are used for reading signals to achieve a higher recording density and a larger capacity. Accordingly, the spherical aberration and the coma aberration caused by a tilt are severer than in DVD. Therefore, the thickness of a light transmission layer 43 lies in a position a minimum distance of 587 µm and a maximum distance of 613 µm away from the incidence plane 42.

Figure 5:
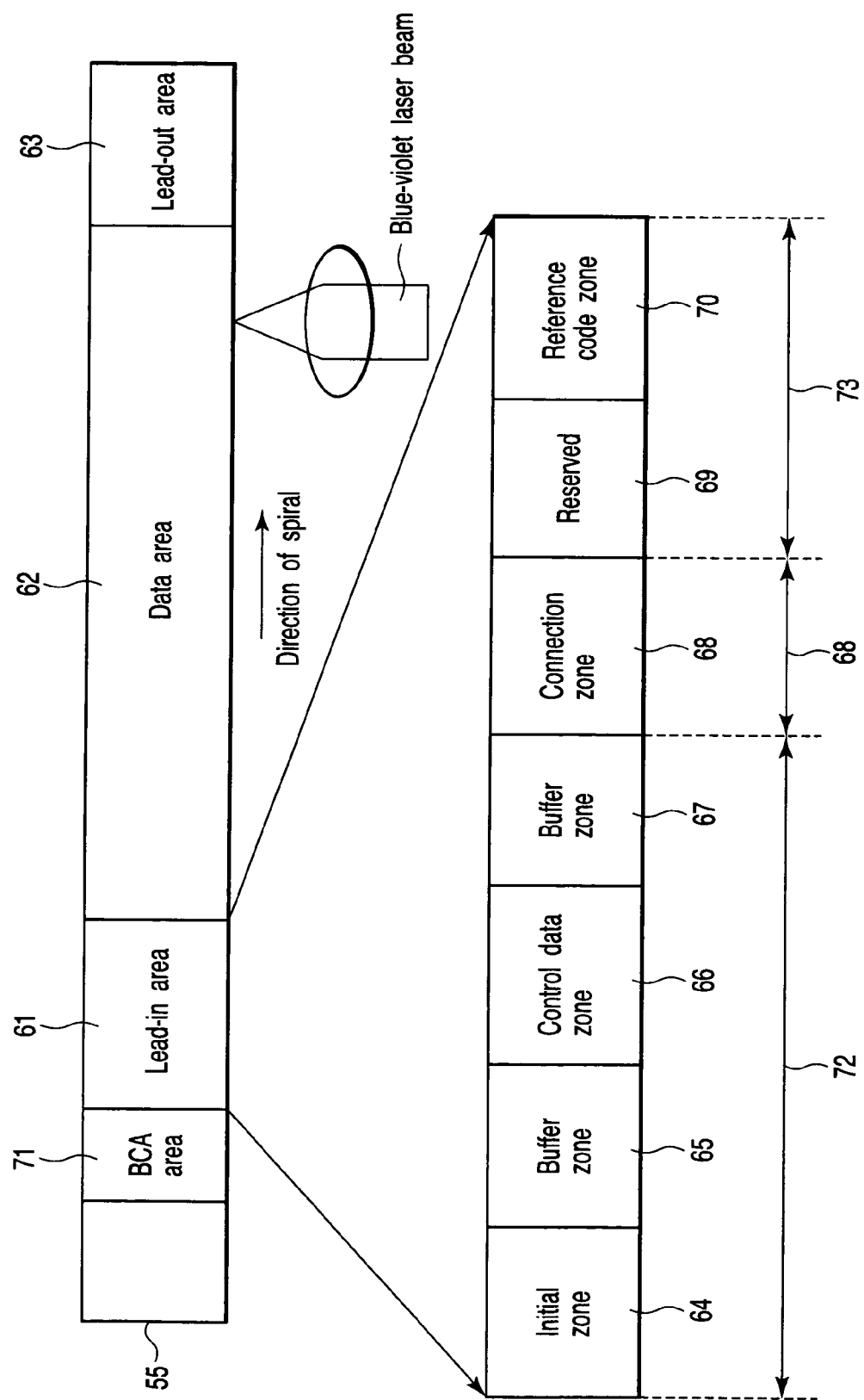
FIG. 5 shows the configuration of a recording area of a single-sided single layer HD DVD disc.

FIG. 5 shows the configuration of a recording area in a single-sided single layer HD DVD disc. As in DVD, in an HD DVD recording layer 54 (the recording layer 45 in FIG. 4), a Lead-in area 61, a Data area 62, a Lead-out area 63, and a Burst Cutting Area (BCA) 71 are formed. Although the BCA 71 may be optionally formed in DVD, the formation of a BCA is indispensable in HD DVD. The Lead-in area 61 is composed of a System Lead-in area 72, a Connection zone 68, and a Data Lead-in area 73. A Control data zone 66 is formed in the System Lead-in area 72. The System Lead-in area 72 further includes an Initial zone 64, Buffer zones 65, 67. The Data Lead-in area 73 includes a reserved area 69 and a Reference code zone 70.

Figure 6:
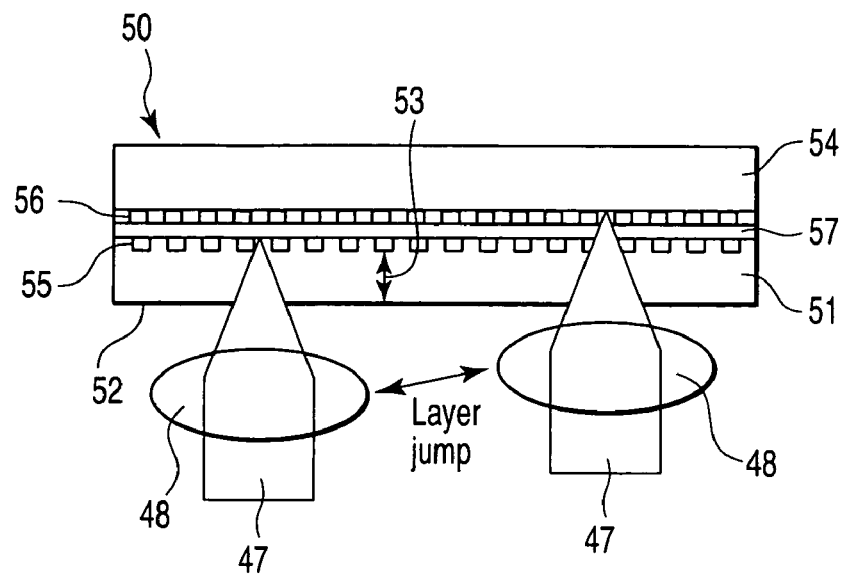
FIG. 6 shows the relationship between the basic structure of a single-sided dual layer HD DVD disc and an optical head.

FIG. 6 shows the relationship between the basic structure of a single-sided dual layer HD DVD disc 50 and an optical head. As in the single layer disc, the spherical aberration and the coma aberration caused by a tilt are severer as a result of making the wavelength shorter and NA larger. The first recording layer (L0) 55 is limited to a position a minimum distance of 578 µm away from the incidence plane and the second recording layer (L1 layer) 56 is limited to a position a maximum distance of 622 µm away from the incidence plane. The distance between the two layers (or space layer 57) is set as 20±5 µm (15 to 25 µm).

<Existing DVD and Next-Generation DVD>

If a large capacity HD DVD capable of accumulating HD images is proposed, an HD DVD apparatus (drive or player) can be newly designed so that it can read not only HD DVD but also DVD. However, since the HD DVD differs greatly from the DVD in recording density, modulation system, signal processing, track format, and others, a conventional DVD apparatus (drive or player) cannot read the data from the HD DVD disc. That is, the conventional DVD apparatus has the problem of being unable to read not only the HD movie content recorded in the HD DVD disc but also the conventional DVD movie content recorded in the HD DVD disc, which becomes a factor that hinders the spread of HD DVD.

To overcome this problem, the inventors of this invention have devised means for enabling a single disc to carry both the information recorded in the next-generation DVD format and the information recorded in the existing DVD format and further enabling a reproducing apparatus and the user to recognize the configuration of the disc.

<The Basic Concept of this Invention is as Follows>

An optical disc according to the present invention is basically specified by following items 1 to 4:

(1) The optical disc is a single-sided dual layer optical disc where a light transmission layer, a first recording layer accessed with a first laser beam, a space layer, and a second recording layer accessed with a second laser beam are arranged in that order in the direction in which the laser beam enters (2) The areal recoding density of the second recording layer is three times or more that of the first recording layer (3) Information indicating that the second recording layer has been formed has been formed in the first recording layer (4) Information indicating that the first recording layer has been formed is formed in the second recording layer An optical disc of the present invention can be embodied on the basis of not only the above basic items but also following items 5 and 6.

(5) Information indicating that the second recording layer has been formed is formed in the Lead-in area of the first recording layer (6) Information indicating that the first recording layer has been formed is formed in the Lead-in area or BCA area of the second recording layer An optical disc apparatus of the present invention can be embodied on the basis of not only the above items but also following items 7 and 8.

(7) Information on the second recording layer has been included in initial screen information on audio and visual works recorded in the first recording layer (8) Information on the first recording layer has been included in initial screen information on audio and visual works recorded in the second recording layer An optical disc apparatus according to the present invention is specified by following items 9 to 14:

(9) The optical disc apparatus is an apparatus for reading the information recorded on an optical disc

(10) The optical disc is such that a light transmission layer, a first recording layer accessed with a first laser beam, a space layer, and a second recording layer accessed with a second laser beam are arranged in that order in the direction in which the laser beam enters

(11) The areal recoding density of the second recording layer is three times or more that of the first recording layer

(12) Information indicating that the second recording layer has been formed is formed in the first recording layer

(13) Information indicating that the first recording layer has been formed is formed in the second recording layer

(14) The apparatus for reading the information comprises an optical head capable of generating a first laser beam and a second laser beam, means for detecting from the first recording layer that the second recording layer has been formed, and means for detecting from the second recording layer that the first recording layer has been formed, and control means for selectively causing the first laser beam or the second laser beam to be generated.

An optical disc apparatus of the present invention can be embodied on the basis of not only the above basic items but also following item 15:

(15) Control means selects the first laser beam or the second laser beam on the basis of the user input from a user interface An optical disc apparatus according to the present invention is specified by following items 16 to 21:

(16) The optical disc apparatus is an apparatus for reading the information recorded on an optical disc

(17) The optical disc is such that a light transmission layer, a first recording layer accessed with a first laser beam, a space layer, and a second recording layer accessed with a second laser beam are arranged in that order in the direction in which the laser beam enters

(18) The areal recoding density of the second recording layer is three times or more that of the first recording layer

(19) Information indicating that the second recording layer has been formed is formed in the first recording layer

(20) Information indicating that the first recording layer has been formed is formed in the second recording layer

(21) The apparatus for reading the information comprises an optical head capable of generating a first laser beam and a second laser beam, means for detecting the presence of the second recording layer, and means for informing the user of the presence of the second layer An optical disc apparatus according to the present invention is specified by following items 22 to 27:

(22) The optical disc apparatus is a reproducing apparatus-capable of reading the information recorded on an optical disc and displaying audio and visual work information on a display on the basis of the information

(23) The optical disc is such that a light transmission layer, a first recording layer accessed with a first laser beam, a space layer, and a second recording layer accessed with a second laser beam are arranged in that order in the direction in which the laser beam enters

(24) The areal recoding density of the second recording layer is three times or more that of the first recording layer

(25) Information on the second recording layer has been included in the initial screen information on audio and visual contents recorded in the first recording layer

(26) Information on the first recording layer has been included in initial screen information on audio and visual works recorded in the second recording layer

(27) The reproducing apparatus comprises an optical head capable of generating a first laser beam and a second laser beam and means for causing the first laser beam or the second laser beam to be generated on the basis of the user input from a user interface from the initial screen information on audio and visual works being reproduced and selectively reproducing the first recording layer or the second recording layer According to the present invention, there is provided an optical disc which enables a first recording layer (corresponding to a DVD layer) and a second recording layer (corresponding to an HD DVD layer) to be accessed from one side with a first laser beam (or red laser) and a second laser beam (blue-violet laser), respectively. Therefore, both DVD movie content and HD DVD movie content can be recorded on a single disc. That is, this disc is a combination disc capable of dealing with both SD video and HD video.

A conventional DVD-compatible optical disc apparatus can reproduce DVD content. A new HD DVD-compatible optical disc apparatus can reproduce HD DVD movie content or both HD DVD movie content and DVD movie content.

For instance, the same movie content is prepared in the form of DVD content and HD DVD content. These two kinds of movie content are recorded on a single disc. This enables the user having only a DVD-compatible apparatus to watch the DVD movie content and the user having an HD DVD-compatible apparatus to watch the HD DVD movie.

If the user who does not have an HD DVD-compatible apparatus buys an HD DVD-compatible apparatus in the future, the user can enjoy the HD video on the already bought discs without buying new HD discs. This provides a great benefit to the user.

Furthermore, with the present invention, since information indicating that an HD DVD layer has been formed is formed in a DVD layer and information indicating that a DVD layer has been formed is formed in an HD DVD layer, it is easy to select whether to use the DVD layer or the HD DVD layer with an apparatus capable of reading information from both of the layers. In addition, even if an apparatus can read only a DVD layer, it is possible to inform the user that an HD DVD layer has been formed in the disc now in use. Therefore, the present invention provides a great benefit to the user.

<Basic Configuration of an Optical Disc According to this Invention>

Figure 7:
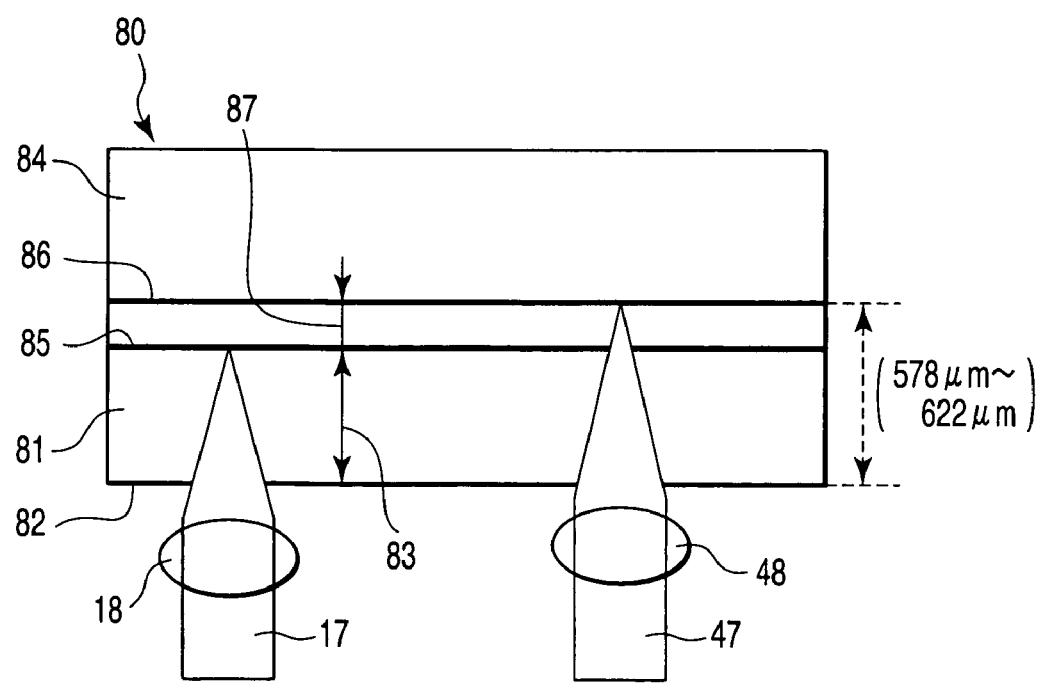
FIG. 7 shows the relationship between an example of the basic structure of an optical disc according to the present invention and an optical head.

FIGS. 7 and 8 show the relationship between an optical disc 80 according to an embodiment of the present invention and an optical head. FIG. 8 is a view of the discs of FIGS. 2 and 5 being bonded together.

As shown in FIG. 7, the optical disc 80 is composed of a first substrate 81 and a second substrate 84. In the optical disc 80, a first recording layer (corresponding to a DVD layer) 85 made of a semi-transparent film is formed closer to the incidence plane 82 of a laser beam and a second recording layer (corresponding to an HD DVD layer) 86 made of a high reflection film is formed less close to the incidence plane.

To reproduce data from the HD DVD layer 86 with a blue-violet laser beam, the HD DVD layer has to be a minimum distance of 578 µm and a maximum distance of 622 µm away from the incidence plane as explained in FIG. 6 (because of limitations of spherical aberration). In addition, if the DVD layer 85 is a Thin single layer, the DVD layer has to be a minimum distance of 550 µm and a maximum distance of 580 µm away from the incidence plane as explained in FIG. 1 (the minimum distance of 550 µm is the limitation imposed by spherical aberration).

The space layer 87 is determined, taking into account a crosstalk occurring between the DVD layer 85 and the HD DVD layer 86. In the case of the HD DVD, the space layer 87 has a thickness of 15 µm or more. In the case of the DVD, the space layer 87 has a thickness of 40 µm. Both cases depend on the optical system.

Taking these into account, the first recording layer (or DVD layer) 85 is set in a position 550 to 575 µm away from the incidence plane 82, the space layer 87 is set in a position 28 to 47 µm away from the incidence plane, and the second recording layer (or HD DVD layer) 86 is set in a position 578 to 622 µm away from the incidence plane 82.

<Reflectivity and Others>

For an optical disc to be recognized as a single-sided thin single layer disc with one of the conventional DVD apparatuses commercially available in large quantities, the optical signal returning from the DVD layer 86 has to be 45% or more the red laser beam 17. If the blue-violet laser beam 47 is irradiated onto the same disc, the optical signal returning from the HD DVD 86 has to be subjected to focus and tracking servos and be reproduced.

The Reflectivity of blue-violet laser light is determined in the HD DVD standard as follows:

In the case of HD DVD-ROM
Single-sided single layer disc: 40% to 70% (including double pass birefringence)
Single-sided dual layer disc: 18% to 32% (including double pass birefringence)
HD DVD Rewritable (at System Lead-in area)
Single-sided single layer disc: 4% to 8% (including double pass birefringence)

In the case of an optical disc of the present invention, since the position of the HD DVD layer is made equal to that in a single-sided dual layer disc of an HD DVD-ROM, it is desirable that the reflectivity should fall in the determined range. Since HD DVD has not been produced on a commercial basis, new requirements for the HD DVD layer of the optical disc can be added. In that case, the lower limit of the reflectivity has to be larger than that of an HD DVD-Rewritable.

Next, flag information and identifying information on the DVD layer 85 will be explained.

<Flag Information>

In an optical disc of the present invention, the DVD layer 85 has to be treated as an ordinary single-sided Single Layer DVD-ROM disc. ID of a Data frame and (BP2) in Physical format information in the Control data zone 37 are set as a single-sided Single Layer DVD-ROM disc.

Setting ID (4 bytes)
b29: 0b when the Reflectivity is larger than 40%
b24: 0b Single Layer disc The other settings are the same as in an ordinary DVD-ROM disc.

Specifically, 0b is written in b29 in ID, representing that the Reflectivity is larger than 40%. 0b is written in b24, representing a Single Layer disc.

Setting Physical Format Information in the Control Data Zone
(BP2)
b6 to b5: 00b Single (the number of layers)

Specifically, 00b is set in the sixth and fifth bits in byte position BP2, representing that the number of layers indicates single.

The other settings are the same as in an ordinary DVD-ROM.

<Identifying Information>

Information indicating that the HD DVD layer 86 has been formed in the DVD layer 85 is included in b3 of Layer type in (BP2 in Physical format information in the Control data zone. The bit is reserved even in a recording DVD, such as a DVD-R/RW disc or a DVD-RAM disc other than a DVD-ROM disc. Using this bit has no effect.

Therefore, in addition to the setting of the Control data zone, the following is set in (BP2) in Physical format information in the Control data zone:

b3: 1b the DVD layer is present in the first recording layer, the HD DVD layer is present in the second recording layer Besides this, since b7 is reserved, the following may be set in (BP2) in Physical format information in the Control data zone:

b7: 1b the DVD layer is present in the first recording layer, the HD DVD layer is present in the second recording layer That is, 1b is written in the seventh bit, representing that the first recording layer is a DVD layer and the second recording layer is HD DVD.

Physical format information in the Control data zone contains 2048 bytes in total. Since most of them are in reserved, it is possible to use them in the range that prevents conflict with another recording disc.

Next, flag information and identifying information on the HD DVD layer 86 will be explained.

<Flag Information>

In an optical disc of the present invention, the HD DVD layer 86 has to be treated as an ordinary single-sided Single Layer DVD-ROM. Since the reflectivity is low, information indicating reproducing conditions and the like are set on the assumption that the Reflectivity is smaller than 40%. ID of a data frame and (BP2) in Physical format information in the Control data zone 66 are set as a single-sided single Layer DVD-ROM disc.

Setting ID (4 bytes)
b29: 1b when the Reflectivity is smaller than 40%
b24: 0b Single Layer disc That is, 1b is written in b29 in ID, representing that the Reflectivity is smaller than 40%. 0b is written in b24, representing a Single Layer disc.

The other settings are the same as in an ordinary HD DVD-ROM disc.

Setting Physical Format Information in the Control Data Zone
(PB2)
b6 to b5: 00b Single (the number of layers)

The other settings are the same as in an ordinary HD DVD-ROM disc.

<Identifying Information>

Information which is written in the HD DVD layer 86 and indicates that the DVD layer 85 has been formed is in b3 of Layer type in (BP2) in Physical format information in the Control data zone. The bit is reserved even in a recording HD DVD, such as an HD DVD-R disc or an HD DVD-Rewritable disc other than an HD DVD-ROM disc. Using this bit has no effect.

Therefore, in addition to the setting of the Control data zone, the following is set in (BP2) in Physical format information in the Control data zone:

b3: 1b the DVD layer is present in the first recording layer, HD DVD layer is present in the second recording layer That is, b1 is written in b3, representing that a DVD is present in the first recording layer and an HD DVD is present in the second recording layer.

<Initial Screen Compatible with the Present Invention and Reproduction>

Figure 9:
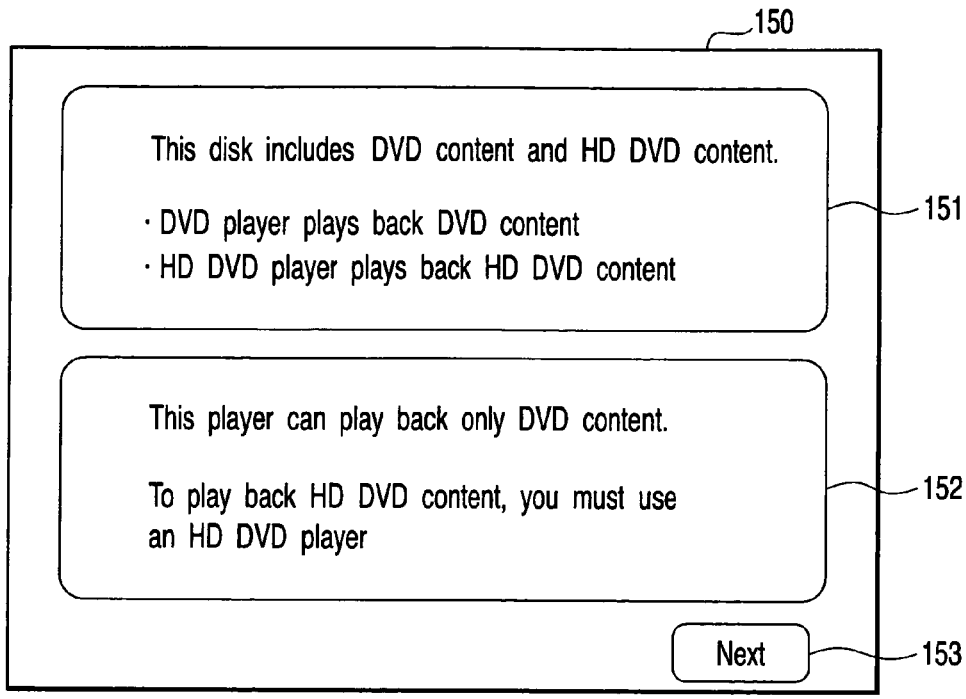
FIG. 9 shows a DVD initial screen (1) compatible with the present invention.

A menu that shows an outline of the entire works is recorded in a DVD disc in which visual works have been recorded. Usually, the menu can be displayed on a display by pressing the menu button on a remote control switch unit. FIG. 9 is a view (menu 150) of a DVD player initial screen (1) compatible with the present invention. When a disc according to the present invention is installed in a DVD player, for example, an initial screen (1) appears as the first screen. Then, for example, the following messages appear as comments 151 and 152: the comments 151 are "This disc includes DVD and HD DVD content", "This player plays back DVD content", and "HD DVD player plays back HD DVD content" and the comments 152 are "This player can play back only DVD content", and "Use an HD DVD player to play back HD DVD content". Moreover, a button 153 for going to the next step is displayed. When control goes to the next step, a display menu for the titles and chapters recorded in the DVD appear. The above comments have been recorded in the disc as menu content. The present invention is not limited to such menus. The messages may be given in a foreign language or in a combination of marks, pictogram, and the like.

Figure 10:
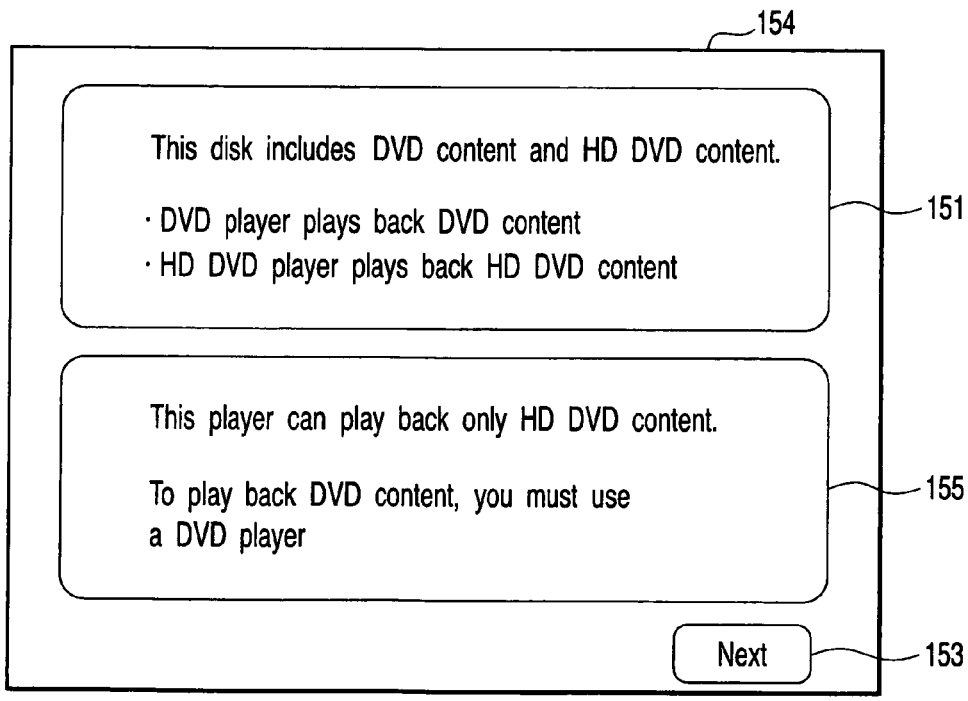
FIG. 10 shows an HD DVD initial screen (2) compatible with the present invention.

FIG. 10 is a view (menu 154) of an HD DVD player initial screen (2). When a disc according to the present invention is installed in an HD DVD player, for example, an initial screen (2) appears as the first screen. Then, for example, the following messages appear. The comments 151 are the same as those on the initial screen (1). The comments 155 are "This player can play back only HD DVD content", and "Use a DVD player to play back DVD content". Moreover, a button 153 for proceeding to the next step is displayed.

FIG. 11 is a view (menu 156) of a DVD/HD DVD compatible player initial screen (3). The comments 151 are the same as those on the initial screen (1) or (2). The comments 157 are "A player compatible with both DVD and HD DVD can play back both of DVD and HD DVD content", and "Click one of the bottoms below to select either DVD content or HD DVD content". A button 158 for playing back DVD and a button 159 for playing pack HD DVD are displayed.

Figure 13B:
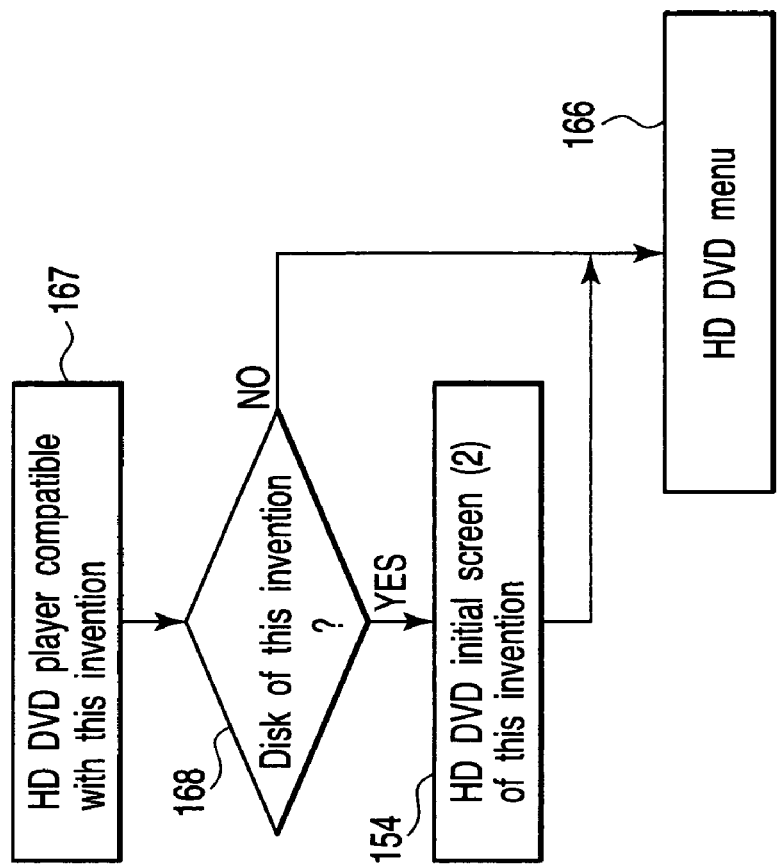
FIGS. 13A and 13B are flowcharts to help explain the relationship between the HD DVD player and the initial screen outputting process.
Figure 13A:
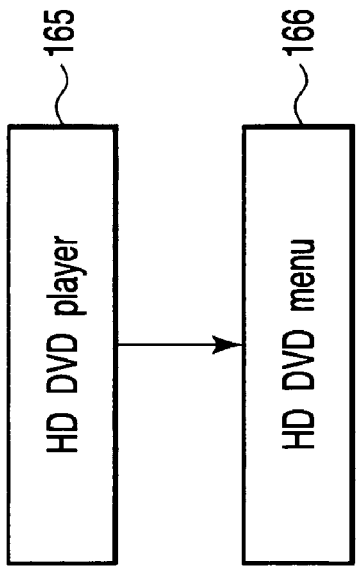

FIGS. 12A and 12B are flowcharts to help explain the relationship between the DVD player and the initial screen. FIGS. 13A and 13B are flowcharts to help explain the relationship between the HD DVD player and the initial screen. FIGS. 14A and 14B are flowcharts to help explain the relationship between the DVD/HD DVD compatible player and the initial screen.

As shown in FIG. 12A, suppose a disc 80 of the present invention is installed in a conventional DVD player 160. Since this player does not have the function of reading identifying information, the player displays a DVD menu 161. On the other hand, as shown in FIG. 12B, since a player 162 compatible with this invention can read and determine the identifying information (163), if the disc is a disc of the invention, the player 162 displays a menu 150. When the user selects Next button 153, the DVD menu 161 appears, which enables DVD works to be played back.

As shown in FIG. 13A, a disc 80 of the present invention is installed in an HD DVD player 165. Since this player does not have the function of reading identifying information, the player displays an HD DVD menu 166. On the other hand, as shown in FIG. 13B, since a player 167 compatible with this invention can read and determine the identifying information (168), if the disc is a disc of the invention, the player 167 displays a menu 154. When the user selects Next button 153, the HD DVD menu 166 appears, which enables HD DVD content to be played back.

As shown in FIG. 14A, a disc 80 of the present invention is installed in a DVD/HD DVD compatible player. It is determined whether the disc is a DVD disc or an HD DVD disc 171. If it is a DVD disc, a DVD menu 172 appears. If it is an HD DVD disc, an HD DVD menu 173 appears. If the information in the Lead-in area can be read with the read laser beam 17, it is determined that the disc is a DVD disc. If the information in the Lead-in area can be read with the blue-violet laser beam 47, it is determined that the disc is an HD DVD.

On the other hand, as shown in FIG. 14B, since a DVD/HD DVD compatible player related to this invention can read identifying information (step 175), if the installed disc is a DVD/HD DVD disc, the player displays a menu 156. The user selects either the DVD button 158 or HD DVD button 159 on the display screen, thereby selecting either DVD or HD DVD.

If DVD is selected, the menu 172 appears. If HD DVD is selected, the menu 173 appears.

If the installed disc is not a DVD/HD DVD disc, but an ordinary DVD or HD DVD disc, the DVD/HD DVD compatible player 174 is controlled by the same flow as the DVD/HD DVD compatible player 170.

Next, actual reproduction will be explained in further detail.

<Reproduction by an Optical Disc Apparatus Complying with the DVD Standard>

Figure 17:
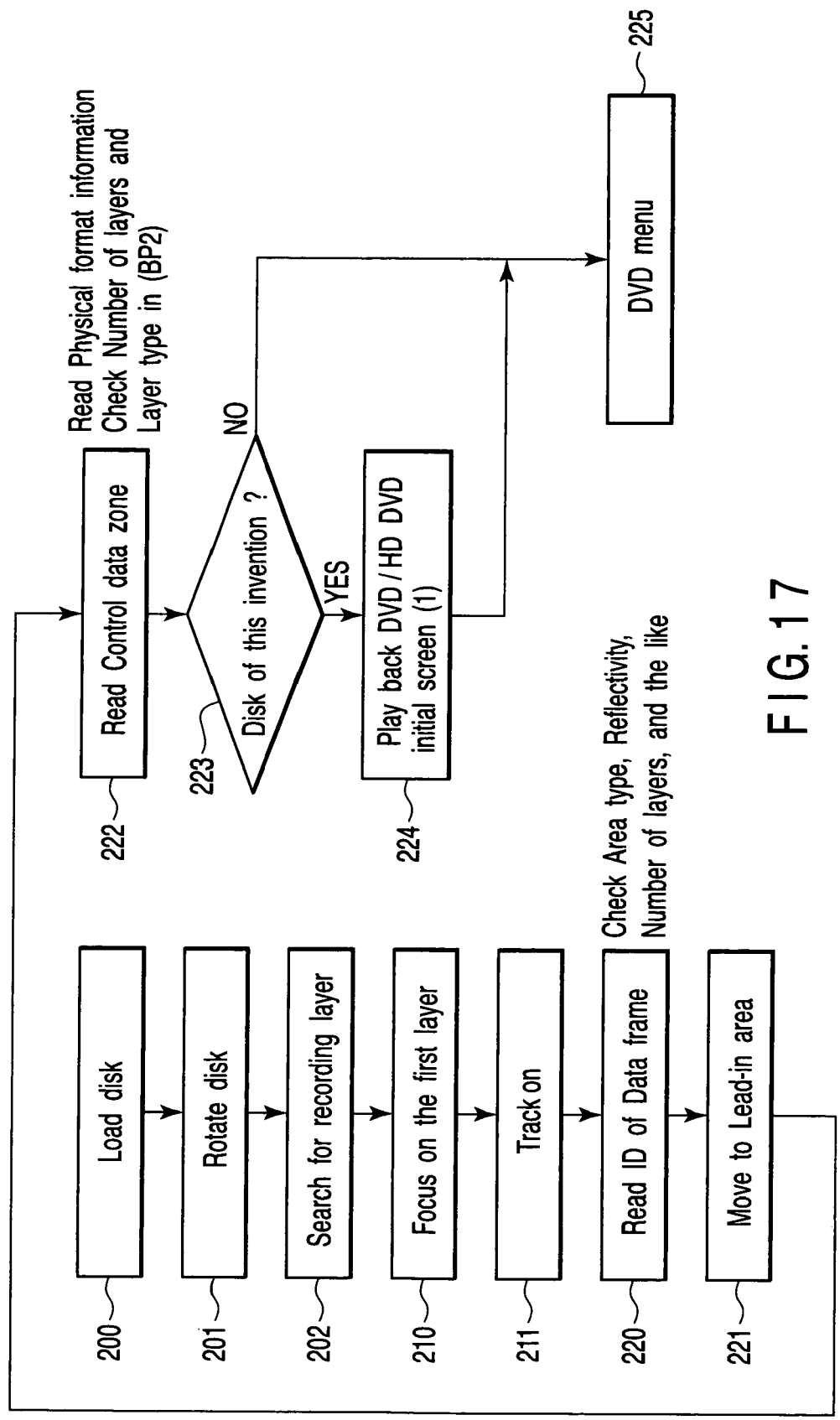
FIG. 17 is a flowchart to help explain the operation of the DVD player.

Next, a case where a disc of this invention is played back on a DVD player compatible with this invention will be explained using FIGS. 15, 16, and 17. FIG. 15 shows a main configuration of the DVD player and a display 143. FIG. 16 shows a remote control switch unit 180 for the DVD player. FIG. 17 is a flowchart to help explain the operation of the DVD player.

Referring to FIG. 15, a main configuration of the DVD apparatus will be explained briefly. A spindle motor 100 rotates a turntable. A clamper 101 holds an optical disc 80 in place on the turntable. The spindle motor 100 is controlled by a motor driver 102. An optical head 110 includes an objective 18 and an optical system 113. The optical system 113 is driven by a focus and tracking actuator 116. When the focus and tracking actuator 116 is controlled by an actuator driver 118, the laser beam is focused on a track on the optical disc and follows the track. A radial actuator 117 is used to move the optical head 110 in the direction of radius of the optical head 110 and is controlled by the actuator driver 118.

The reflected light from the disc is taken out of the optical system 113 and is converted into an electric signal at a photo detector in a conversion unit 115. The electric signal is gain-adjusted at a reproduced signal amplifier in a gain adjusting unit 120 and the resulting signal is input to a signal processing circuit 121. The signal processing circuit 121 performs a demodulating process, buffering, error correction, and others and inputs the resulting signal to a data processing circuit 122. The data processing circuit 122 performs packet separation, control signal separation, and the like and inputs video and audio information to an AV decoder 130. The video signal, audio signal, sub-video signal, and the like demodulated at the AV decoder 130 are output as a base-band signal via an AV amplifier 31. The base-band signal is input to a monitor 143.

Using a focus error signal and tracking error signal obtained by, for example, processing numerically the reproduced signal from a 4-quadrant photodiode, a servo controller 140 supplies a control signal to the actuator driver 118. In response to a signal from a console (e.g., a remote controller or an operation key input section) 142, the system controller 141 controls the playback, stop, pause, and the like. In addition, the system controller 141 controls the laser diode driver in the gain adjusting unit 120. The laser diode driver drives the laser diode installed in the optical head 110, thereby outputting a laser beam.

When an optical disc 80 of the present invention is installed in a DVD player compatible with this invention, the spindle motor 100 rotates until a specific number of revolutions have been reached. Next, a periodic driving current is caused to flow through the focus actuator 116, thereby moving the optical head up and down in the direction of axis (searching for a recording layer in step 200 to step 202 in FIG. 17). Since the level of the focus signal from the DVD layer is larger than the level of the signal from the HD DVD layer, the DVD apparatus recognizes the disc as a single-sided single layer DVD disc and focuses on the first recording layer (DVD layer) (step 210). Then, the tracking servo is turned on, thereby tracking a suitable position of the disc (step 211). In this state, ID of Data frame is read (step 220), Area type, Reflectivity, Layer number, and others of the disc are checked. Then, the radial actuator 117 is driven, moving the optical head to the Lead-in area (step 221). Next, the optical head is moved to the Control data zone (step 222) and reads Number of layers and Layer type from (BP2) in Physical formation information, thereby verifying that the disc is a single-sided single layer DVD disc of the present invention (step 223). Then, the menu 150 of FIG. 9 appears. The user moves the cursor from right to left or up and down using the selector switch 183 on the remote control switch unit 180 (FIG. 16). When the cursor has reached the target position, the user presses the input button 184, thereby displaying a specific image.

<Reproduction by an Optical Disc Apparatus Complying with the HD DVD Standard>

Next, a blue-violet laser HD DVD apparatus compatible with this invention will be explained using FIGS. 18, 19, and 16.

Figure 18:
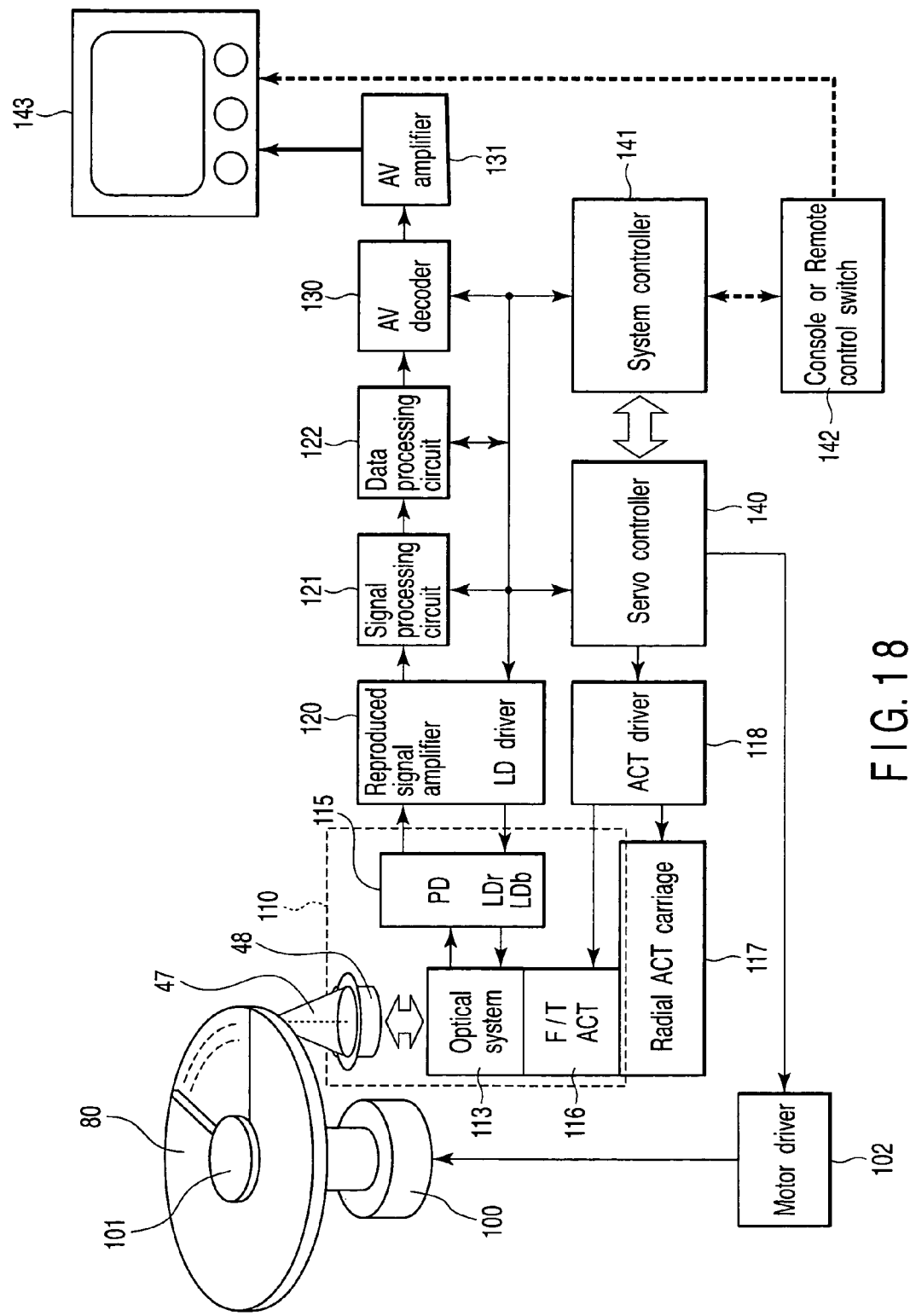
FIG. 18 shows an example of the configuration of an HD DVD player compatible with the present invention.

As shown in FIG. 18, since the HD DVD apparatus has almost the same functional blocks as in the configuration of the DVD apparatus shown in FIG. 15, the like parts are indicated by the same reference numerals in FIG. 15. In the case of the HD DVD apparatus, a laser diode that outputs a blue-violet laser beam is provided in a photoelectric conversion unit 115. The objective 48 differs from the objective 18 in numerical aperture.

Figure 19:
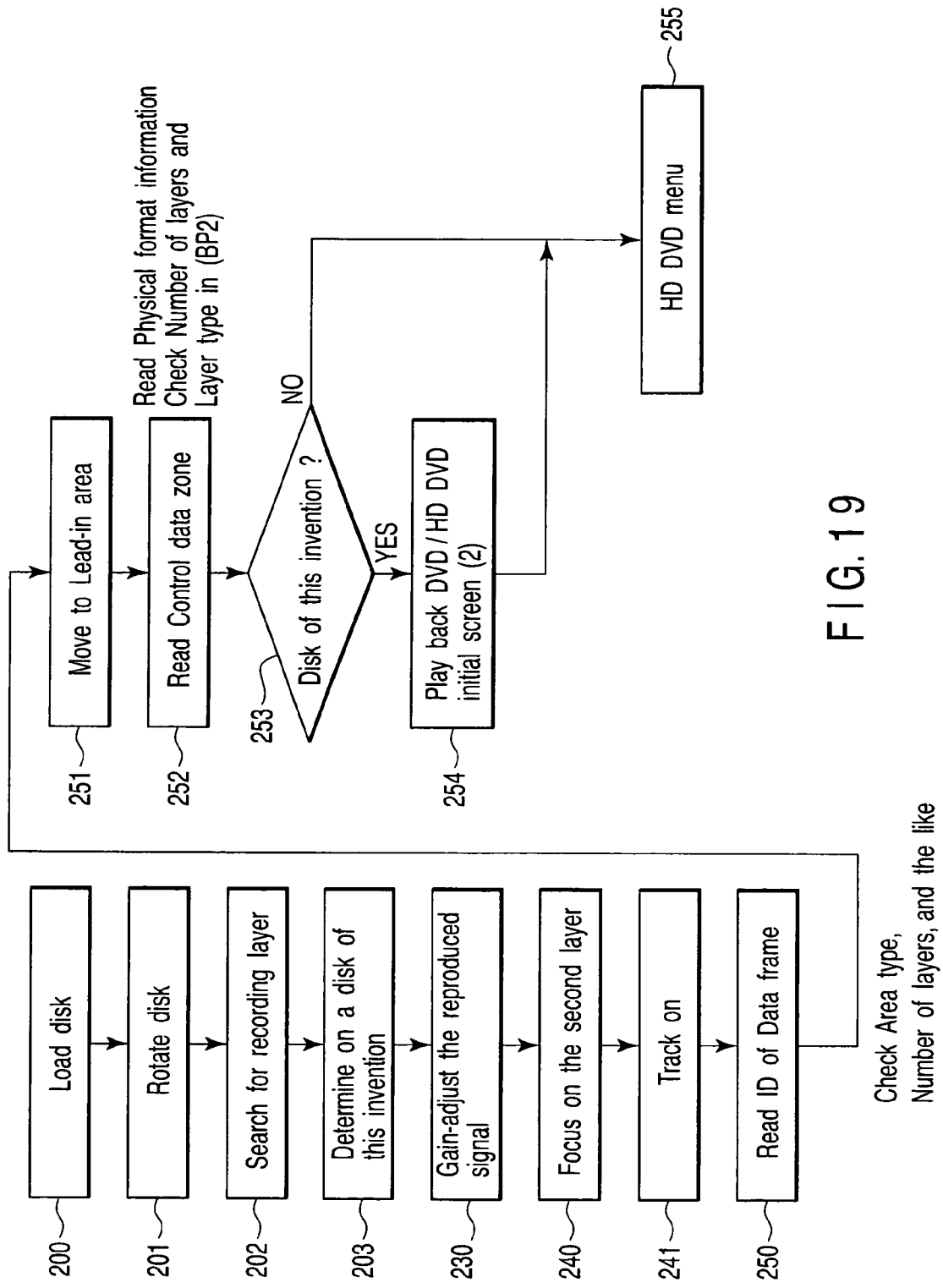
FIG. 19 is a flowchart to help explain the operation of the HD DVD player (only with HD DVD)

First, a periodic driving current is caused to flow through the focus actuator 116, thereby searching for a recording layer (step 200 to step 202 in FIG. 19). From the focus signals and the difference between their signal levels, it is recognized that there are two recording layers and the disc is a disc of the present invention (step 203). Since the reproduced signal is small, the gain of the reproduced signal is adjusted (step 230), the second layer (HD DVD layer) is focused on (step 240), and then the tracking servo is turned on (step 241), which causes the disc to be tracked in a suitable position.

Then, ID of Data frame is read (step 250), Area type, Reflectivity, Layer number, and others of the disc are checked. Then, the radial actuator 117 is driven, moving the optical head to the Lead-in area (step 251). Next, the optical head is moved to the Control data zone (step 252) and reads Number of layers and Layer type from (BP2) b3 in Physical format information, thereby verifying that the disc is a single-sided single layer HD DVD disc of the present invention (step 253). Then, the menu 154 of FIG. 10 appears. The user moves the cursor from right to left or up and down using the selector switch 183 on the remote control switch unit 180 of FIG. 16. When the cursor has reached the target position, the user presses the input button 184, thereby displaying a specific image.

<Reproduction by an Optical Disc Apparatus Complying with Both of the DVD Standard and HD DVD Standard>

Next, a compatible apparatus of the present invention using both of red laser light and blue-violet laser light will be explained using FIGS. 20, 21, 22, 23, and 24.

Figure 20:
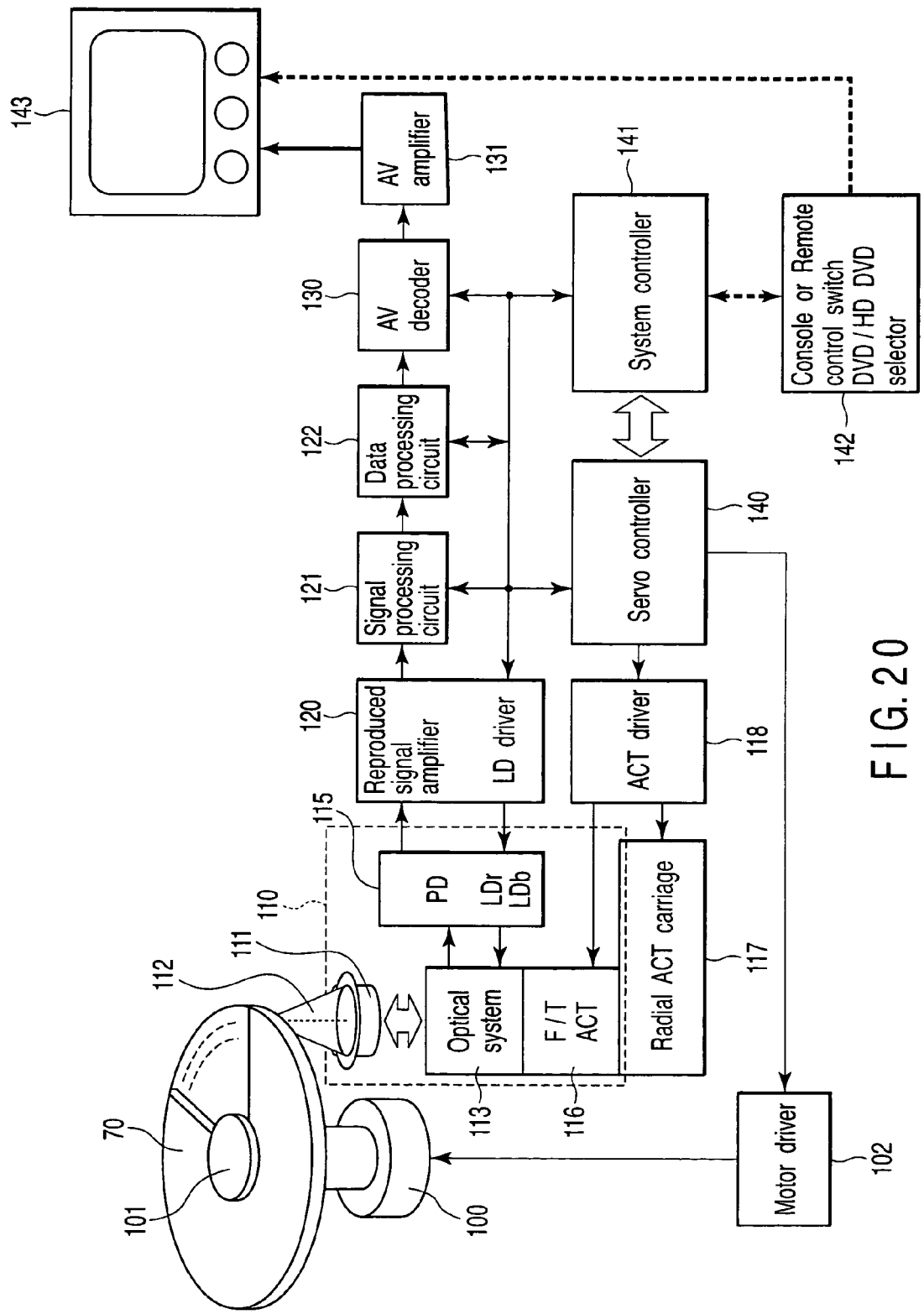
FIG. 20 shows an example of the configuration of a DVD/HD DVD compatible player compatible with the present invention.
Figure 21:
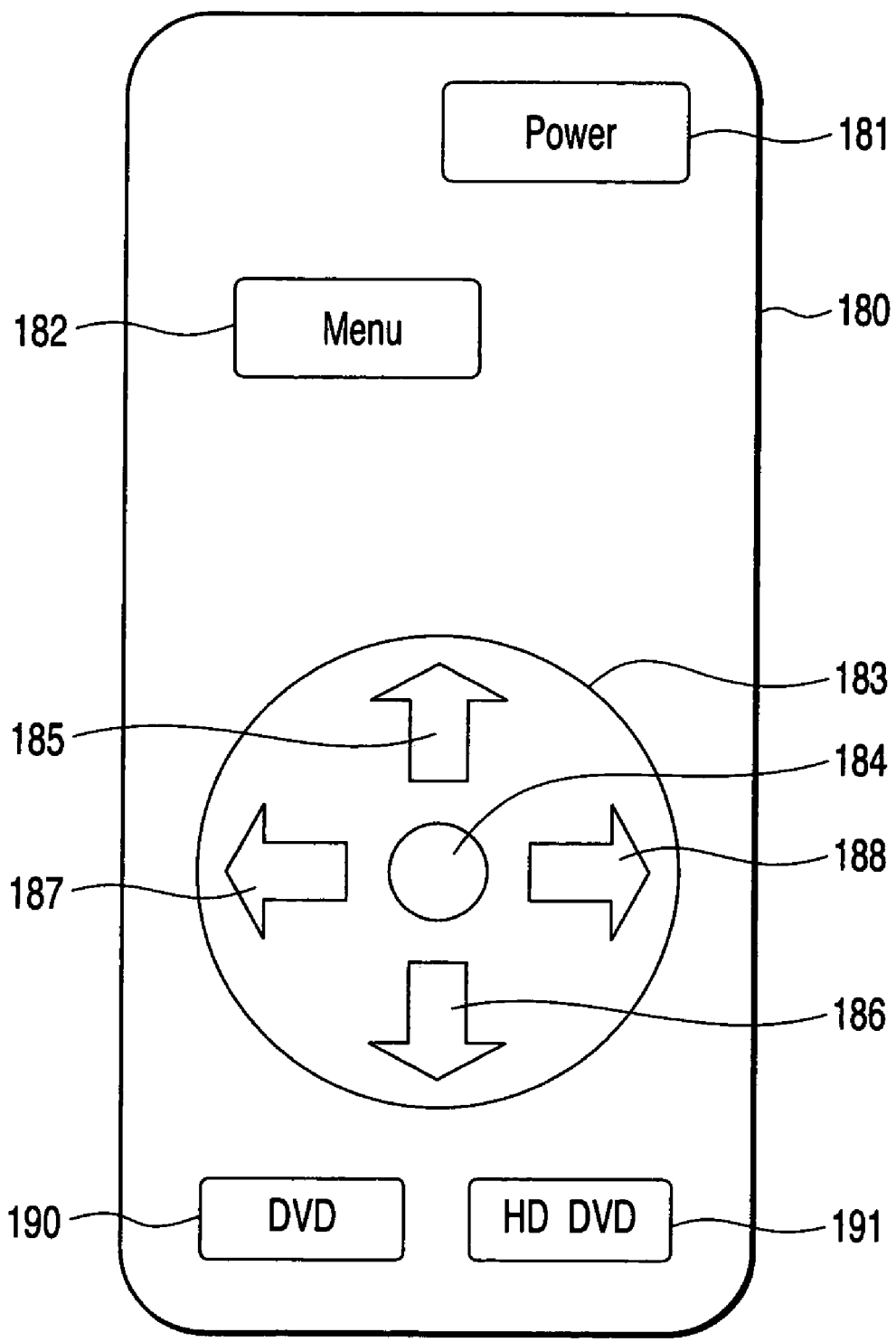
FIG. 21 shows a remote control switch unit for a DVD/HD DVD compatible player.

As shown in FIG. 20, since the compatible apparatus has almost the same functional blocks as in the configuration of the DVD apparatus shown in FIG. 15 and in the configuration of the HD DVD shown in FIG. 18, the like parts are indicated by the same reference numerals in FIGS. 15 and 18. In the case of the compatible apparatus, a laser diode LDr that outputs red laser light and a laser diode LDb that outputs blue-violet laser light are provided in a photoelectric conversion unit 115. The objective 111 is selective according to, for example, the wavelength of a laser beam. The numerical aperture changes adaptively between a red laser beam and a blue-violet laser beam. Alternatively, the objective lens may be of the switching type.

Figure 22:
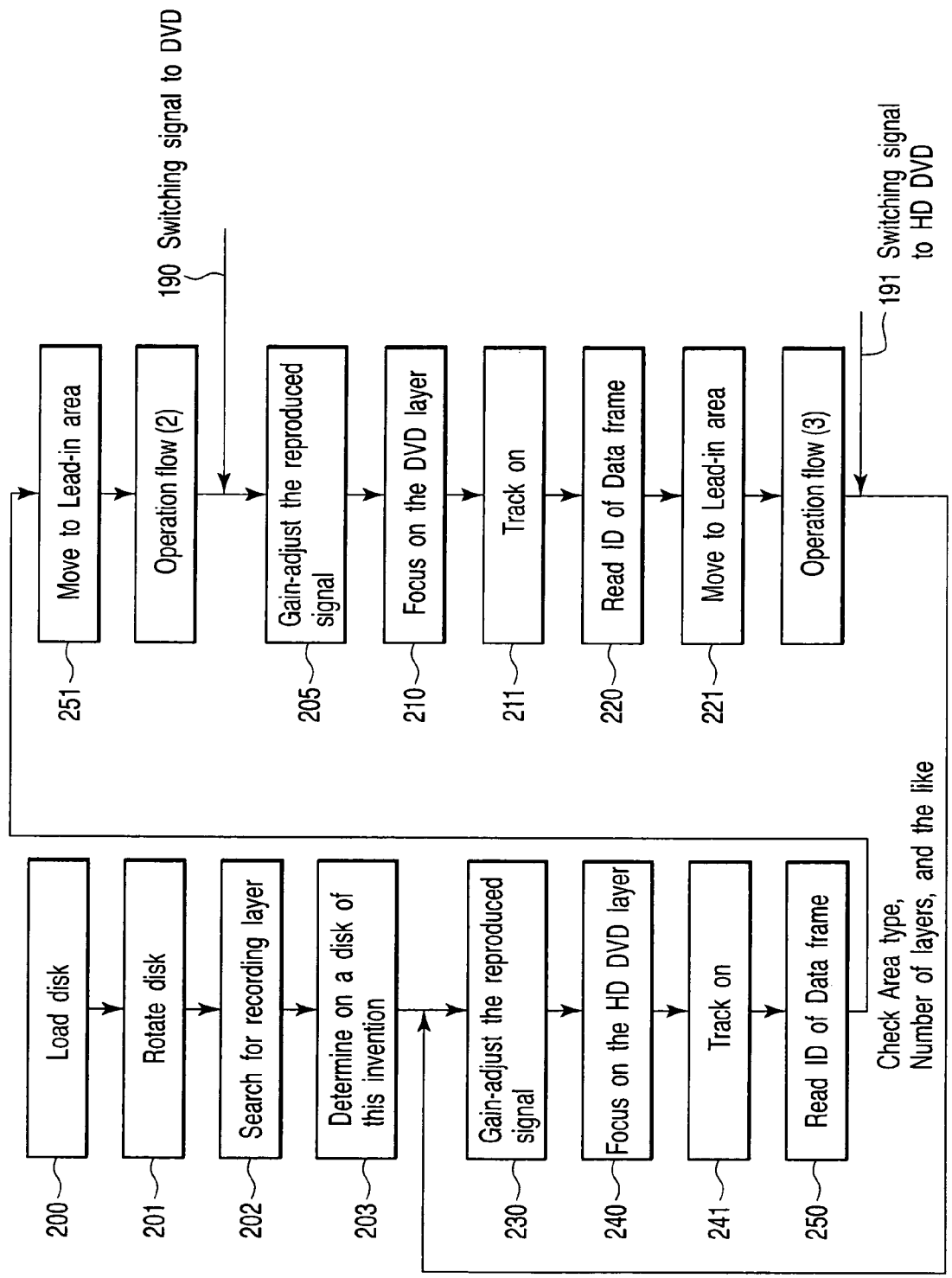
FIG. 22 is a flowchart (1) to help explain the operation of the DVD/HD DVD compatible player.

In the compatible apparatus, first, a blue-violet laser beam is turned on and a driving current is caused to flow through the focus actuator 116, thereby searching for a recording layer (step 200 to step 202 in FIG. 22).

From the levels of the focus signals, it is determined that the disc is a disc of the present invention (step 203). The amplitude of the focus error signal from the first recording layer is, for example, twice or more that of the focus error signal from the second recording layer or vice versa. The level of the focus error signal from DVD is larger and the level of the focus error signal from HD DVD is smaller. The gain of the reproduced signal is adjusted (step 230), the HD DVD layer is focused on (step 240), and then the tracking servo is turned on (step 241), which causes the disc to be tracked in a suitable position.

Then, ID of Data frame is read (step 250), Area type, Reflectivity, Layer number, and others of the disc are checked. Then, the radial actuator 117 is driven, moving the optical head to the Lead-in area (step 251).

Thereafter, the operation proceeds according to such a flowchart as shown in FIG. 19. The optical head is moved to the Control data zone (step 252) and reads Number of layers and Layer type from (BP2) b3 in Physical format information, thereby verifying that the disc is a single-sided single layer HD DVD disc of the present invention (step 253). Then, the menu 156 of FIG. 11 appears (254). In this case, the message that HD DVD button 159 has already been selected is displayed. On the remote control switch unit 180 of FIG. 17 at the user's fingertips, HD DVD button 159 lights up, which indicates that the HD DVD layer has been selected.

On the selector switch 183 of the remote control switch unit, selecting HD DVD button and pressing the input button 184 or pressing HD DVD button 159 on the remote control switch unit causes an HD DVD menu to appear. Of course, pressing the menu button on the remote control switch unit causes the HD DVD menu to appear. Then, the user moves the cursor from right to left or up and down using the selector switch 183. When the cursor has reached the target position, the user presses the input button 184, thereby displaying HD DVD images.

Figure 23:
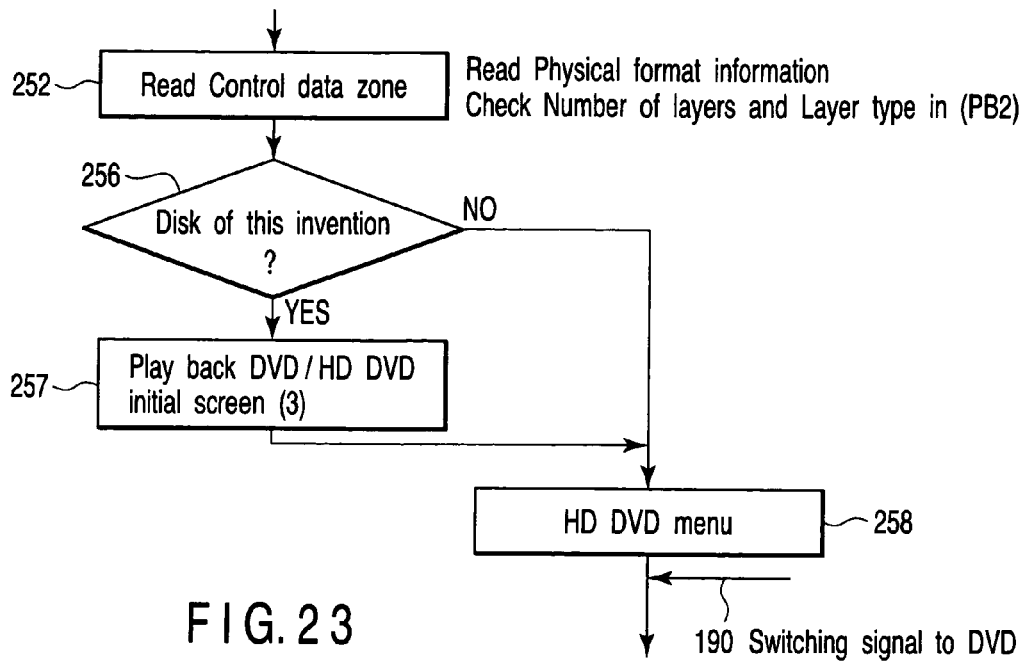
FIG. 23 is a flowchart (2) to help explain the operation of the DVD/HD DVD compatible player.
Figure 24:
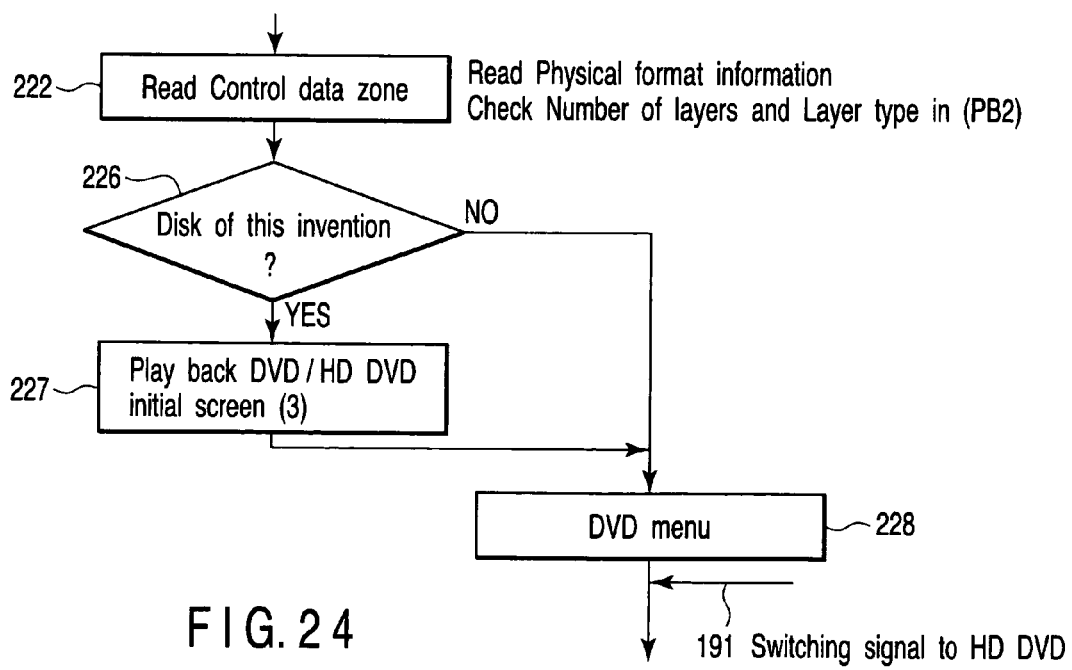
FIG. 24 is a flowchart (3) to help explain the operation of the DVD/HD DVD compatible player.

Next, when the user selects DVD button 190 on the remote control switch unit 180, the second layer (HD DVD layer) is changed to the first layer (DVD layer) (refer to a switching signal 190 to DVD in FIGS. 22 and 23).

Then, the DVD apparatus adjusts the gain of the reproduced signal (step 205 in FIG. 22) and focuses the beam on the DVD layer (step S210), thereby tracking on a suitable position of the disc is obtained (step 211). Next, ID of Data frame is checked (step 220). Then, the optical head is moved to the Lead-in area (step 221).

Thereafter, the operation proceeds according to such a flowchart as shown in FIG. 17. The flag of the Control data zone is checked (step 222 in FIGS. 17 and 24) and Number of layers and Layer type are read from (BP2) b3 in Physical format information, thereby verifying that the disc is a single-sided single layer DVD disc of the present invention (step 223). Then, the menu 156 of FIG. 11 appears (step 224). In this case, the message that DVD button 158 has already been selected is displayed. On the remote control switch unit 180 of FIG. 17 at the user's fingertips, DVD button 158 lights up, which indicates that the DVD layer has been selected.

On the selector switch 183 of the remote control switch unit, selecting DVD button and pressing the input button 184 or pressing DVD button 158 on the remote control switch unit causes a DVD menu to appear. Of course, pressing the menu button on the remote control switch unit causes the DVD menu to appear. Then, the user moves the cursor from right to left or up and down using the selector switch 183. When the cursor has reached the target position, the user presses the input button 184, thereby displaying DVD images.

Here, the user may select DVD button 190 on the remote control switch unit 180, thereby switching from the reproduction of the second layer (HD DVD layer) to the reproduction of the first layer (DVD layer) (refer to the switching signal 191 to HD DVD in FIGS. 22 and 4).

Other Embodiments

In the above explanation, b3 in (BP2) in Physical format information in the control data zone has been used as the identifying information on a disc of the present invention.

Since b7 is reserved, the following may be set in (BP2) in Physical format information in the Control data zone:

b7: 1b the DVD layer and second recording layer (HD DVD layer) are present in the first recording layer Physical format information in the Control data zone contains 2048 bytes in total. Since most (BP) are in reserved, it is possible to use them in the range that prevents conflict with another recording disc.

Furthermore, in the case of HD DVD, since BCA formed in BCA area 71 is indispensable, this can be used. BCA contains 64 bytes in total. The configuration of BCA is defined in BCA Data field. In this field, there is a reserved byte. Therefore, this may be used as identifying information.

As described above, an optical disc of this invention is characterized in that the face recording density of the second recording layer is three times or more that of the first recording layer and that information indicating that the second recording layer has been formed is formed in the first recording layer and information indicating that the first recording layer has been formed is formed in the second recording layer. The same holds true when the first recording layer and the second recording layer are replaced with each other.

According to the present invention, it is possible to provide an optical disc which enables the first recording layer (corresponding to the DVD layer) to be accessed with a first laser beam (or red laser light) and the second recording layer (corresponding to the HD DVD layer) to be accessed with a second laser beam (or blue-violet laser light). Therefore, both DVD movie content and HD DVD movie content can be recorded on a single disc, which is therefore a combination disc capable of dealing with both SD images and HD images.

Then, a conventional DVD compatible optical disc apparatus can play back DVD content. A new HD DVD-compatible optical disc apparatus can play back HD DVD movie content or both HD DVD movie content and DVD movie content.

For example, the same movie content is prepared in the form of DVD content and HD DVD content. These two kinds of movie content are recorded into a single disc. This enables the user having only a DVD compatible apparatus to watch the DVD movie content and the user having an HD DVD compatible apparatus to watch the HD DVD movie.

If a user who does not have an HD DVD compatible apparatus buys an HD DVD compatible apparatus in the future, the user can enjoy the HD video on the already bought discs without buying new HD discs. This provides a great benefit to the user.

Furthermore, with the present invention, since information indicating that an HD DVD layer has been formed is formed in a DVD layer and information indicating that a DVD layer has been formed is formed in an HD DVD layer, it is easy to select whether the DVD layer or the HD DVD layer with an apparatus capable of reading information from both of the layers. In addition, even if an apparatus can read only a DVD layer, it is possible to inform the user that an HD DVD layer has been formed in the disc now in use. Therefore, the present invention provides a great benefit to the user.

As above mentioned, the invention includes the following features of apparatuses.

An optical disc apparatus has an optical head capable of generating a first laser beam and a second laser beam, means for detecting from the first recording layer that the second layer has been formed, means for detecting from the second recording layer that the first layer has been formed, and control means for selectively causing either the first laser beam or the second laser beam to be generated.

According to the optical disc apparatus, the control means selects either the first laser beam or the second laser beam on the basis of the user input from a user interface.

An optical disc apparatus has an optical head capable of generating a first laser beam and a second laser beam, and means for causing either the first laser beam or the second laser beam to be generated according to the user input from a user interface on the basis of initial screen information on the reproduced audio and visual content and for selectively reproducing the first recording layer or the second recording layer.

An optical disc apparatus has an optical head which generates a first laser beam, means for detecting the presence of the second recording layer, and means for informing the user of the presence of the second recording layer.

This invention is not limited to the above embodiments and may be embodied by modifying the component elements without departing from the spirit or essential character thereof. In addition, various inventions may be formed by combining suitably a plurality of component elements disclosed in the embodiments. For example, some components may be removed from all of the component elements constituting the embodiments. Furthermore, component elements used in two or more embodiments may be combined suitably.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical disc of a single-sided dual layer where a light transmission layer, a DVD layer as a first recording layer accessed with a red laser beam, a space layer, and a second recording layer accessed with a blue-violet laser beam are arranged in that order in the direction in which a laser beam enters, different format information being recorded on the DVD layer and the second recording layer, the optical disc comprising:

an area recording density of the second recording layer being three times or more than that of the DVD layer;

identification information indicating, that the second recording layer is formed, being formed with detail information related to the DVD layer on Physical format information on a control data zone in a Lead-in area of the DVD layer; and identification information indicating, that the DVD layer is formed, being formed with detail information related to the second recording layer on Physical format information on a control data zone in a Lead-in area and/or identification information indicating, that the DVD layer is formed, being formed with the detail information related to the second recording layer on Physical format information on a BCA area of the second recording layer, wherein the information in the DVD layer includes initial screen information for a menu indicating that the optical disc includes DVD content and the second recording layer's content when audio and visual works recorded in an area in the DVD layer are played back, and the information in the second recording layer includes initial screen information for a menu indicating that the optical disc includes DVD content and the second recording layer's content when audio and visual works recorded in an area in the second recording layer are played back.

2. The optical disc according to claim 1, wherein the initial screen information further includes a menu indicating information relating to an ability of an operating player.

3. A reproducing method of reading a single-sided dual layer optical disc where a light transmission layer, a DVD layer as a first recording layer accessed with a red laser beam, an space layer, and a second recording layer accessed with a blue-violet laser beam are arranged in that order in the direction in which a laser beam enters, different format information being recorded on the DVD layer and the second recording layer, the area recording density of the second recording layer being three times or more that of the DVD layer, identification information indicating, that the second recording layer is formed, being formed with detail information related to the DVD layer on Physical format information on a control data zone in a Lead-in area of the DVD layer, and identification information indicating, that the DVD layer is formed, being formed with detail information related to the second recording layer on Physical format information on a control data zone in a Lead-in area and/or identification information indicating, that the DVD layer of low density is formed, being formed with the detail information related to the second recording layer on Physical format information on a BCA area of the second recording layer, wherein the information in the DVD layer includes initial screen information for a menu indicating that the optical disc includes DVD content and the second recording layer's content when audio and visual works recorded in an area in the DVD layer are played back, and the information in the second recording layer includes initial screen information for a menu indicating that the optical disc includes DVD content and the second recording layer's content when audio and visual works recorded in an area in the second recording layer are played back, the reproducing method comprising:

accessing with a red laser beam and moving a focus spot back and forth in the direction of thickness of the optical disc, focusing on the DVD layer, making gain adjustments, turning on a focus servo, and then turning on a tracking servo;

detecting from the identification information of the DVD layer that the second layer is present; and displaying on a monitor the menu that the second recording layer has been formed in the disc and that only the DVD layer can be reproduced.

4. A reproducing method of reading a single-sided dual layer optical disc where a light transmission layer, a DVD layer as a first recording layer accessed with a red laser beam, an intermediate layer, and a second recording layer accessed with a blue-violet laser beam are arranged in that order in the direction in which a laser beam enters, different format information being recorded on the DVD layer and the second recording layer, the area recording density of the second recording layer being three times or more that of the DVD layer, identification information indicating, that the second recording layer is formed, being formed with detail information related to the DVD layer on Physical format information on a control data zone in a Lead-in area of the DVD layer, and identification information indicating, that the DVD layer is formed, being formed with detail information related to the second recording layer on Physical format information on a control data zone in a Lead-in area and/or identification information indicating, that the DVD layer is formed, being formed with the detail information related to the second recording layer on Physical format information on a BCA area of the second recording layer, wherein the information in the DVD layer includes initial screen information for a menu indicating that the optical disc includes DVD content and the second recording layer's content when audio and visual works recorded in an area in the DVD layer are played back, and the information in the second recording layer includes initial screen information for a menu indicating that the optical disc includes DVD content and the second recording layer's content when audio and visual works recorded in an area in the second recording layer are played back, the reproducing method comprising:

accessing with a blue-violet laser beam, moving a focus spot back and forth in the direction of thickness of the optical disc, and detecting that the DVD layer and the second recording layer are present;

focusing on the second recording layer, making gain adjustments, turning on a focus servo, and then turning on a tracking servo;

detecting from the identification information of the second recording layer that the DVD layer is present;

displaying on a monitor the menu that the DVD layer is formed in the disc and that only the second recording layer can be reproduced.

5. A reproducing method of reading a single-sided dual layer optical disc where a light transmission layer, a DVD layer as a first recording layer accessed with a red laser beam, an intermediate layer, and a second recording layer accessed with a blue-violet laser beam are arranged in that order in the direction in which a laser beam enters, different format information being recorded on the DVD layer and the second recording layer, the area recording density of the second recording layer being three times or more that of the DVD layer, identification information indicating that the second recording layer has been formed being formed with detail information related to the DVD layer on Physical format information on a control data zone in a Lead-in area of the DVD layer, and identification information indicating, that the DVD layer is formed, being formed with detail information related to the second recording layer on Physical format information on a control data zone in a Lead-in area and/or identification information indicating, that the DVD layer is formed, being formed with the detail information related to the second recording layer on Physical format information on a BCA area of the second recording layer, wherein the information in the DVD layer includes initial screen information for a menu indicating that the optical disc includes DVD content and the second recording layer's content when audio and visual works recorded in an area in the DVD layer are played back, and the information in the second recording layer includes initial screen information for a menu indicating that the optical disc includes DVD content and the second recording layer's content when audio and visual works recorded in an area in the second recording layer are played back, the reproducing method comprising:

using a red laser beam so as to move a focus spot back and forth in the direction of thickness of the optical disc and detecting that the DVD layer and the second recording layer are present;

focusing on the DVD layer, making gain adjustments, turning on a focus servo, then turning on a tracking servo, and detecting the identification information indicating the presence of the second recording layer from the DVD layer; or using a blue-violet laser beam so as to move a focused state back and forth in the direction of thickness of the optical disc and detecting that the DVD recording layer and the second recording layer are present;

focusing on the second recording layer, making gain adjustments, turning on a focus servo, then turning on a tracking servo, and detecting the identification information indicating the presence of the DVD layer from the second recording layer; and displaying on a monitor a message or a button which prompts the user to determine whether to reproduce the DVD layer or the second recording layer.

6. An optical disc of a single-sided dual layer where a light transmission layer, a first recording layer accessed with a blue-violet laser beam, a space layer, and a DVD layer as a second recording layer accessed with a read laser beam are arranged in that order in the direction in which a laser beam enters, different format information being recorded on the first recording layer and the DVD layer, wherein the information in the DVD layer includes initial screen information for a menu indicating that the optical disc includes DVD content and the first recording layer's content when audio and visual works recorded in an area in the DVD layer are played back, and the information in the first recording layer includes initial screen information for a menu indicating that the optical disc includes DVD content and the first recording layer's content when audio and visual works recorded in an area in the first recording layer are played back, the optical disc comprising:

an area recording density of the first recording layer being three times or more that of the DVD layer;

identification information indicating, that the second recording layer is formed, being formed with detail information related to the second recording layer on Physical format information on a control data zone in a Lead-in area and/or identification information indicating, that the second recording layer is formed, being formed with the detail information related to the second recording layer on Physical format information on a BCA area of the second recording layer, and identification information indicating, that the second recording layer is formed, being formed with detail information related to the DVD layer on Physical format information on a control data zone in a Lead-in area of the DVD layer.

\* \* \* \* \*